(12) United States Patent
Amano et al.

(10) Patent No.: US 8,679,207 B2
(45) Date of Patent: Mar. 25, 2014

(54) WEAR RESISTING PARTICLE AND WEAR RESISTING STRUCTURE MEMBER

(75) Inventors: Masaharu Amano, Hirakata (JP);
Takanori Nagata, Hirakata (JP);
Mitsushi Inoshita, Toyonaka (JP); Kenji Iwamoto, Toyonaka (JP)

(73) Assignees: Komatsu Ltd., Tokyo (JP); Japan New Metals Co., Ltd., Osaka (JP)

( * ) Notice: Subject to any disclaimer, the term of this patent is extended or adjusted under 35 U.S.C. 154(b) by 740 days.

(21) Appl. No.: 12/224,283

(22) PCT Filed: Mar. 30, 2007

(86) PCT No.: PCT/JP2007/057728
§ 371 (c)(1),
(2), (4) Date: Sep. 24, 2008

(87) PCT Pub. No.: WO2007/114524
PCT Pub. Date: Oct. 11, 2007

(65) Prior Publication Data
US 2009/0019783 A1   Jan. 22, 2009

(30) Foreign Application Priority Data
Mar. 30, 2006 (JP) .................. 2006-095450

(51) Int. Cl.
*B24D 3/02* (2006.01)
*C09C 1/68* (2006.01)
*C09K 3/14* (2006.01)

(52) U.S. Cl.
USPC ............. 51/309; 428/148; 428/218; 428/402; 428/403

(58) Field of Classification Search
USPC ...................... 51/309; 428/402, 403
See application file for complete search history.

(56) References Cited

U.S. PATENT DOCUMENTS

| 3,617,363 | A | * | 11/1971 | Metzger et al. | ............ | 427/383.7 |
| 3,753,667 | A | * | 8/1973 | Metzger et al. | ............... | 428/639 |
| 3,955,855 | A | * | 5/1976 | Massieon et al. | ............. | 305/192 |
| 4,097,711 | A | * | 6/1978 | Banerjee | .................... | 219/76.15 |
| 4,243,727 | A | * | 1/1981 | Wisler et al. | .................. | 428/558 |

(Continued)

FOREIGN PATENT DOCUMENTS

| GB | 2273109 A | * | 6/1994 | |
| JP | 56087648 A | * | 7/1981 | ............. C22C 29/00 |

(Continued)

OTHER PUBLICATIONS

International Search Report issued Jul. 10, 2007 in the International (PCT) Application of which the present application is the U.S. National Stage.

*Primary Examiner* — Kaj K Olsen
*Assistant Examiner* — Ross J Christie
(74) *Attorney, Agent, or Firm* — Wenderoth, Lind & Ponack, L.L.P.

(57) ABSTRACT

Disclosed is a wear-resistant particle which can be substantially uniformly dispersed in a molten pool. Specifically disclosed is a wear-resistant particle (13) which is dispersed in a matrix metal for improving wear resistance thereof. The wear-resistant particle is characterized by being composed of a material containing a first hard material and a second hard material while having a particle diameter of 0.2-9 mm. The wear-resistant particle is further characterized in that the material consists of 60-96% by volume of a carbide and the balance of a metal.

16 Claims, 18 Drawing Sheets

(56) References Cited

U.S. PATENT DOCUMENTS

| | | | | |
|---|---|---|---|---|
| 4,378,975 A | * | 4/1983 | Tomlinson et al. | 51/309 |
| 4,682,987 A | * | 7/1987 | Brady et al. | 51/293 |
| 5,852,272 A | * | 12/1998 | Amano | 219/76.14 |
| 5,967,248 A | * | 10/1999 | Drake et al. | 175/425 |
| 5,988,302 A | * | 11/1999 | Sreshta et al. | 175/374 |
| 6,029,759 A | * | 2/2000 | Sue et al. | 175/374 |
| 6,102,140 A | * | 8/2000 | Boyce et al. | 175/374 |
| 6,348,273 B1 | * | 2/2002 | Ishikawa et al. | 428/403 |
| 6,414,258 B1 | * | 7/2002 | Amano | 219/76.14 |
| 6,469,278 B1 | * | 10/2002 | Boyce | 219/146.1 |
| 6,641,918 B1 | * | 11/2003 | Sherman et al. | 428/403 |
| 7,345,255 B2 | * | 3/2008 | Jiang et al. | 219/121.46 |
| 2003/0070464 A1 | * | 4/2003 | Morales | 72/60 |
| 2006/0177677 A1 | * | 8/2006 | Singer et al. | 428/469 |
| 2007/0254171 A1 | * | 11/2007 | Patel et al. | 428/457 |
| 2008/0292897 A1 | * | 11/2008 | Ross et al. | 428/548 |

FOREIGN PATENT DOCUMENTS

| | | | | |
|---|---|---|---|---|
| JP | 63-157707 | | 6/1988 | |
| JP | 01053790 A | * | 3/1989 | |
| JP | 03202401 A | * | 9/1991 | |
| JP | 7-32189 | | 2/1995 | |
| JP | 8-47774 | | 2/1996 | |
| JP | 11-277246 | | 10/1999 | |
| JP | 11-323470 | | 11/1999 | |
| JP | 2002-173758 | | 6/2002 | |
| JP | 2005171283 A | * | 6/2005 | C22C 29/04 |
| JP | 2005194573 A | * | 7/2005 | C22C 29/02 |
| JP | 2005350707 A | * | 12/2005 | C22C 29/04 |
| JP | 2007268552 A | * | 10/2007 | |
| WO | WO 2004026509 A1 | * | 4/2004 | |

* cited by examiner (A)

(B)

(A)            (B)            (C)

WEAR RESISTING PARTICLE AND WEAR RESISTING STRUCTURE MEMBER

BACKGROUND OF THE INVENTION (1) Field of the Invention

The present invention relates to a wear resisting particle and a wear resisting structure member, specifically to a wear resisting particle which can be uniformly dispersed in a molten weld pool, and also to a wear resisting structure member which is provided with a buildup layer in which the wear resisting particle are almost uniformly dispersed.

(2) Description of Related Art

There are three typical examples of conventional processes to manufacture a wear resisting structure member in which hard particles as wear resisting particles are dispersed: namely, the first one is to form a wear resisting buildup layer by forming a molten weld pool at the buildup portion using consumable electrode arc welding, tungsten inert gas welding, gas welding, plasma powder welding, and the like, while adding carbide particles as the hard particles to the molten weld pool to conduct buildup action; the second one is to insert carbide particles into the coating of the coated arc electrode in advance, or to embed carbide particles into a hollowed arc rod; and the third one is the cast-in insertion process which injects a molten metal into the mould while setting carbide particles therein.

(The Case of Arc Welding and Gas Welding)

Tungsten carbide (WC, $W_2C$) based compounds have the highest performance among the hard particles. The tungsten carbide-based compounds, however, have larger specific gravity than any of mother materials, and the hard particles of the tungsten carbide-based compound unavoidably settle in the wear resisting buildup layer independent of the particle size, thereby resulting in cohesion in the lower layer, as illustrated in FIG. 25. Coarser particles more easily settle. As a result, the lower layer of the wear resisting buildup layer gives stronger wear resisting property, and the upper layer thereof gives weaker wear resisting property. In addition, the agglutinated portion of the hard particles likely induces cracks which easily propagate, thus readily becoming the portion of separation of the wear resisting buildup layer.

Since tungsten carbide easily dissolves in Fe, a eutectic carbide of Fe—W likely precipitates in the wear resisting buildup layer, thus becoming brittle and easily generating cracks, and gives poor impact resistance. In recent years, the price of tungsten ore has increased, and tungsten carbide becomes extremely expensive among the hard particles, giving the unit price per kg of as high as one hundred and several tens of times the price of steel sheet. That is a disadvantage of tungsten carbide in terms of cost, which only allows being used in limited applications. Since tungsten carbide easily dissolves in Fe, a brittle compound is likely to be formed at interface between the hard particle and the mother phase metal. Accordingly, the important points on forming a wear resisting buildup layer in which tungsten carbide is dispersed are that the hard particles are not heated as far as possible, and that the contact time between the hard particles and the molten weld pool is shortened. Even when the tungsten carbide is eluted into the mother phase metal, the mother phase metal is hardened to an adequate level, thus to improve the wear resisting property if only the amount of the eluted tungsten carbide is at an adequate level. A long time period of heating may allow the Fe atoms to penetrate into the carbide, which results in alteration of the hard particles, thus significantly deteriorating the hardness.

Since chromium carbide ($Cr_3C_2$) is an inexpensive material, it is a kind of hard particles applied in a largest amount. However, chromium carbide has lower specific gravity than that of Fe. As a result, it floats on the molten weld pool to result in cohesion in the upper layer, as illustrated in FIG. 26. In addition, since chromium carbide is readily dissolved in Fe, coarse and non-melted hard particles are not easily retained, which deteriorates the wear resisting property of the wear resisting buildup layer in some cases.

Titanium carbide (TiC) or titanium carbonitride (TiCN) is accepted to give excellent wear resisting property next to tungsten carbide (WC), and gives high hardness and thermal stability, thus little reacting with Fe. Therefore, TiC and TiCN have an advantage of allowing to be easily remained as non-melted high hardness and high toughness particles in the wear resisting buildup layer. They are, however, low in specific gravity so that they likely float on the molten weld pool and tend to distribute only in the surface layer of the wear resisting buildup layer, as illustrated in FIG. 27. Since non-melted and coarse hard particles increase the buoyancy, they likely float. In addition, since TiC or TiCN has poor wettability, it shows weak bonding force with the mother phase metal in some cases. When mild steel is used as the mother phase metal, the TiC component is eluted very little so that the mother phase metal does not harden, and deteriorates the wear resisting property.

(The Case of Coated Arc Electrode)

Adding to the heating of arc electrode by Joule's heat, the hard particles are directly exposed to the arc, thus the dissolving of hard particles becomes significant, and the non-melted hard particles are difficult to remain. When TiC hard particles are used, TiC has small reactivity with Fe, and is thermally stable. However, since large amounts of TiC are discharged as slag, TiC does not effectively function for improving the wear resisting property in some cases. The non-uniform distribution of not-melted particles caused by the difference of specific gravity between the TiC particles and the mother phase metal occurs similar to the above case.

(The Case of Cast-in Insertion)

Since the hard particles having different specific gravity from each other have to be fixed, they are forcibly fixed to the cast utilizing wire mesh, water glass, or the like. However, to the pressure at the injection of molten metal, that type of physical fixation is not sufficient, and the arrangement of hard particles is lost in some cases. For the case of cast-in insertion, the hard particles are exposed to the molten metal for a long period of time, thus elution often occurs. In this regard, the TiC-based compounds are advantageous because they are thermally stable and do not easily react with Fe.

FIG. 28 is a schematic drawing illustrating another conventional method for manufacturing the wear resisting structure member. The manufacturing method aims to solve the problem of non-uniform distribution of hard particles owing to the difference in specific gravity between the hard particles and the mother phase metal.

The mechanism for forming the buildup layer, illustrated in FIG. 28, forms the wear resisting buildup layer on a mother material 2. According to the mechanism, an arc electrode 1 made of a welding wire projecting by 25 mm in length is positioned aslope at a tilt angle θ1 (torch angle of 30°) to the right-angle direction of the mother material 2 made of mild steel horizontally positioned. The arc electrode 1 is operated at 280 A of welding current and 28 V of welding voltage, with 100 g/min of feed speed of the welding wire, while supplying carbon dioxide as the shield gas at 30 liter/min into the welding zone. To a molten weld pool 3 formed by an arc generated from the arc electrode 1, there are supplied hard particles 4 composed of WC-7% Co particles (14.5 g/cm³ of density) having 1.2 mm in particle size and second particles 5 composed of steel balls (7.8 g/cm³ of density) having 1.7 mm in particle size via a bifurcate nozzle 6. The bifurcate nozzle 6 weaves (at 30 mm in amplitude of vibration) driven by triangular waves of 1.5 Hz in the direction of welding, or in the direction of this side to far side of the drawing of FIG. 28, thereby feeding the hard particles 4 and the second particles 5 at a rate of 172 g and 28 g per minute, respectively, (at a volume mixing ratio of 1:0.3).

The welding progresses at a speed of 22 cm per minute to the right-hand in FIG. 28 under the above conditions. The molten metal in the molten weld pool 3 supplied with the hard particles 4 and the second particles 5 has a density ranging from 7.06 to 7.21 g/cm³.

As shown in FIG. 28, both the hard particles 4 and the second particles 5 are supplied at rear side (left side), in the direction of welding progress, from the position where the straight line extending the arc electrode 1 crosses the plane of the surface of the mother material 2. Since the molten metal portion in the molten weld pool 3 at the position of supplying these particles 4 and 5 is pushed up by the action of arc, the molten metal portion is solidified without allowing the hard particles 4 to settle. In addition, during the push-up movement, the hard particles 4 and the second particles 5 are mixed together, thus a buildup layer 7 formed by hardening the molten metal portion contains uniformly-dispersed hard particles 4. As a result, the buildup layer 7 has a favorable wear resisting property, (for example, refer to Patent Document 1).

[Patent Document 1] Japanese Patent Laid-Open No. 8-47774 (from paragraph 39 to paragraph 41, and FIG. 2)

BRIEF SUMMARY OF THE INVENTION

As described above, the conventional method for manufacturing wear resisting structure member aims to uniformly disperse the hard particles in the buildup layer by adding the hard particles 4 and the second particles 5, both having different specific gravity from each other, into the molten weld pool in the buildup layer.

The above conventional manufacturing method has, however, drawbacks as described below. If the second particles 5 having smaller specific gravity are added at a good timing to exist below the hard particles 4 having larger specific gravity, the settling of hard particles having larger specific gravity can be prevented. The addition of particles is not assured to be given at that good timing, and portions having non-uniformly dispersed particles unavoidably appear.

Inside the molten weld pool, the hard particles 4 having larger specific gravity likely settle into the lower layer, while the second particles 5 having smaller specific gravity likely float into the upper layer. Consequently, the hard particles and the second particles are separated in the lower layer and the upper layer, respectively, thus inducing segregation of particles having different properties from each other. Since the wear resisting property and the impact resistance depend on the segregation, there appear the portions having non-uniform characteristics over the range from upper layer to lower layer.

The present invention has been devised considering the above situations, and an object of the present invention is to provide wear resisting particles that can almost uniformly disperse in the molten weld pool, and another object of the present invention is to provide a wear resisting structure member that has a buildup layer in which the wear resisting particles are almost uniformly dispersed.

To solve the above problems, the wear resisting particle according to the present invention are the ones being dispersed in a mother phase metal to improve the wear resisting property, having a size in a range from 0.2 to 9 mm, and being composed of a material containing a first hard material and a second hard material, the material containing 60 to 96% by volume of a carbide and balance of a metal.

According to the wear resisting particle of the present invention, it is possible that each of the first hard material and the second hard material binds the carbide therein with the metal.

According to the wear resisting particle of the present invention, it is possible that each of the wear resisting particle is composed of a base and a coating layer coating the surface of the base.

According to the wear resisting particle of the present invention, it is possible that the coating layer is an alloy of any of Fe, Co, Ni, and Cu.

According to the wear resisting particle of the present invention, it is possible that the coating layer is a thermet containing tungsten carbide.

According to the wear resisting particle of the present invention, they preferably have a specific gravity in a range from 0.85 to 1.2 fold increase over the specific gravity of the mother phase metal.

According to the wear resisting particle of the present invention, it is possible that the mother phase metal is an Fe-based material, that the first hard material contains at least one of titanium carbide, vanadium carbide, and chromium carbide, and that the second hard material contains at least one of molybdenum carbide and tungsten carbide.

According to the wear resisting particle of the present invention, it is possible that the mother phase metal is any of Co-based material, Ni-based material, and Cu-based material, that the first hard material contains at least one of titanium carbide, vanadium carbide, and chromium carbide, and that the second hard material contains at least one of molybdenum carbide and tungsten carbide.

The wear resisting particle of the present invention is the ones to disperse into the mother phase metal to improve the wear resisting property, wherein the wear resisting particle are composed of a material containing a first hard material having smaller specific gravity than that of the mother phase metal, and a second hard material having larger specific gravity than that of the mother phase metal, wherein the specific gravity of the mother phase metal is defined as "T", and the difference in the specific gravity from the mother phase metal is defined as "t", then t/T is in a range from 20% to −15%.

According to the wear resisting particle of the present invention, both of the first hard material and the second hard material preferably bind carbide, carbonitride, or one or more of them therein with a metal.

According to the wear resisting particle of the present invention, the mother phase metal is preferably any of Fe-based material, Ni-based material, Co-based material, and Cu-based material.

According to the wear resisting particle of the present invention, each of them preferably has a base and a coating layer coating the surface of the base.

According to the wear resisting particle of the present invention, it is possible that the mother phase metal is an Fe-based material, that the first hard material contains at least one of titanium carbide, titanium carbonitride, vanadium carbide, vanadium carbonitride, zirconium carbide, zirconium carbonitride, chromium carbide, and chromium carbonitride, and that the second hard material contains at least one of molybdenum carbide, molybdenum carbonitride, tantalum carbide, tantalum carbonitride, tungsten carbide, and tungsten carbonitride.

According to the wear resisting particle of the present invention, it is possible that the mother phase metal is any of Co-based material, Ni-based material, and Cu-based material, that the first hard material contains at least one of titanium carbide, titanium carbonitride, vanadium carbide, vanadium carbonitride, zirconium carbide, zirconium carbonitride, chromium carbide, chromium carbonitride, niobium carbide, and niobium carbonitride, and that the second hard material contains at least one of molybdenum carbide, molybdenum carbonitride, tantalum carbide, tantalum carbonitride, tungsten carbide, and tungsten carbonitride.

According to the wear resisting particle of the present invention, it is preferable that the mother phase metal be steel, that the main component of the base is prepared by mixing titanium carbide or titanium carbonitride with tungsten carbide, and that the main component of the coating layer be tungsten carbide.

According to the wear resisting particle of the present invention, it is preferable that the mother phase metal be any of Co-based material, Ni-based material, and Cu-based material, that the main component of the base be prepared by mixing titanium carbide or titanium carbonitride with tungsten carbide, and that the main component of the coating layer be tungsten carbide.

The wear resisting structure member according to the present invention is characterized by including a mother phase metal and the wear resisting particle dispersed in the mother phase metal.

According to the wear resisting structure member of the present invention, it is possible that the mother phase metal containing the dispersed wear resisting particle is a wear resisting buildup layer, and that the wear resisting buildup layer is built-up on the mother material.

According to the wear resisting structure member of the present invention, when a cross section of the mother phase metal cut in almost the gravity direction is divided into halves, upper area and lower area, by a line orthogonal to almost the gravity direction, and the quantity of the wear resisting particle existing in the upper layer of the cross section is defined as "a", while the quantity of the wear resisting particle existing in the lower layer of the cross section is defined as "b", then a/b is preferably 0.38 or larger.

According to the wear resisting structure member of the present invention, it is preferable that the hardness of each of the upper layer and the lower layer in the mother phase metal be in a range from Hv 700 to Hv 1000.

The wear resisting structure member according to the present invention can be applied to any of: tooth plate, impactor, shearing edge, cheek plate, waste feeder bar, and bit of crusher; track bush, sprocket teeth, and shoe lug of bulldozer; bucket, tooth adapter, lip, shroud between teeth, and corner guard of hydraulic excavator; cutting edge, end bit, tooth, ripper point, protector, wear plate, and shank of GET (Ground Engaging Tool) parts; and chopper of iron ring of trash compactor.

As described above, the present invention provides wear resisting particle almost uniformly dispersing in the molten weld pool. Another aspect of the present invention provides a wear resisting structure member having a buildup layer in which the wear resisting particle are almost uniformly dispersed.

[Description of the Reference Numerals]

Figure 1:
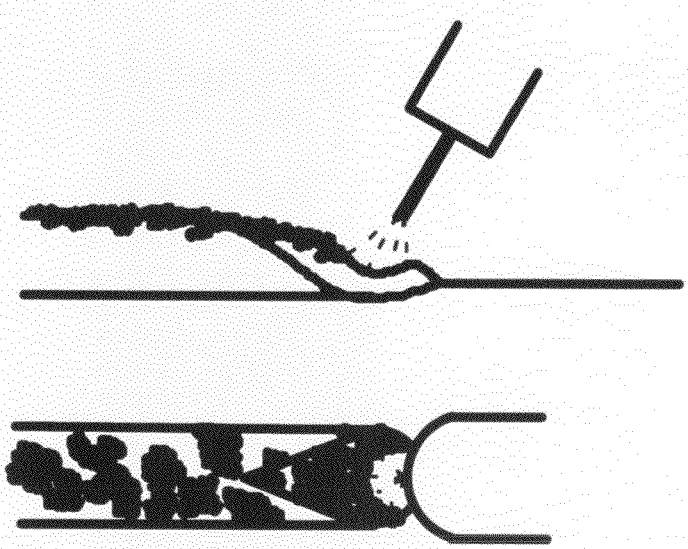
FIG. 1 is a schematic drawing of hardened buildup layer having 6 mm of excess metal height, formed by arc buildup welding using wear resisting particles of 0.1 mm of particle size.

| | |
|---|---|
| 1 | arc electrode |
| 2 | mother material |
| 3 | molten weld pool |
| 4 | hard particle |
| 5 | second particle |
| 6 | bifurcate nozzle |
| 7 | buildup layer |
| 11 | base |
| 12 | coating layer |
| 13 | wear resisting particle |
| 26 | nozzle |
| 31 | crawler track |
| 32 | link |
| 33 | bush |
| 34 | crawler track pin |
| 35 | track shoe |
| 36 | sprocket |
| 37 | tooth groove |
| 38 | arc electrode |
| 39, 39' | mother material |
| 40 | molten weld pool |
| 41 | super-hard particle |
| 42 | nozzle |
| 43, 43', 50 | buildup layer |

DETAILED DESCRIPTION OF THE INVENTION

The wear resisting structure member preferably has the following characteristics.

(Wear Resisting Property)

Hardness and toughness of hard particle affect most strongly the wear resisting property. Higher hardness gives stronger wear resisting property, and higher toughness induces less vacancy and dropping of particles, thus improving the wear resisting property. Accordingly, the hard particles preferably have high hardness and high toughness.

Other strong variables affecting the wear resisting property include hardness and toughness of the mother phase metal portion which holds the hard particles, (hereinafter referred to as the "mother phase metal"). Accordingly, it is preferable to avoid precipitation and crack generation of brittle compounds in the mother phase metal.

Also the content of hard particles significantly affects the wear resisting property. Although larger amount of the hard particles gives stronger wear resisting property, excessive amount thereof deteriorates toughness as entire wear resisting material. Consequently, it is preferable that even a large amount of hard particles do not deteriorate the toughness. To this end, the hard particle itself preferably has high toughness, and the hard particles strongly bind with the mother phase metal.

In addition, compatibility of the hard particles with the mother phase metal is also important. With a combination of materials having poor wettability and giving poor bonding therebetween in metallurgical point of view, or with a combination of materials forming a brittle compound at an interface therebetween, the hard particles drop off. If large cracks or the like appear in the wear resisting buildup layer, defects occur beginning froth the cracks or the like. Therefore, a preferable combination of the materials is the materials giving good compatibility and wettability between hard particles and mother phase metal, allowing readily binding theretogether in view of metallurgy, and inducing no brittle compound at the interface therebetween.

(Impact Resistance)

To maintain toughness of rocks resisting the impaction therebetween, the following-characteristics are required. Adding to the toughness of the hard particles and the mother phase metal, the distribution of the hard particles affects the toughness. For example, if the hard particles settle and agglutinate at lower portion of the buildup layer, separation may occur beginning from the portion. Also for the case that the hard particles are fine having 0.1 mm or smaller size, the cohesive of particles occurs so that cracks likely occur. Cracks on the wear resisting buildup layer deteriorate the impact resistance. Accordingly, the hard particles are preferably uniformly dispersed.

Furthermore, voids accompanied with poor penetration of the mother phase metal become the portions of stress intensification, which deteriorates the impact resistance. Consequently, it is preferable that the wettability between the mother phase metal and the hard particles be high.

(Workability)

It is preferable that the wear resisting buildup layer be easily formed at a necessary position of the wear resisting structure member giving necessary thickness and shape. To increase the thickness of the buildup layer, multilayer buildup is often applied. It is, however, important to attain easy working such that the multilayer buildup does not induce cracks and that no crack is generated even without applying preheating and post-heating. High workability is advantageous also in view of cost.

The embodiments of the present invention will be described below referring to the drawings.

Embodiment 1

The first hard material and the second hard material of the wear resisting particles are variously combined with each other to give the specific gravity thereof almost equal to that of the mother phase metal, or to give 20% to −15%, preferably within ±10%, of difference in specific gravity from that of the mother phase metal. Otherwise, it is preferable that the specific gravity of the wear resisting particles be 0.85 to 1.2 fold increase over that of the mother phase metal. For instance, the first hard material is a material having smaller specific gravity than that of an Fe-based mother phase metal: TiC (density from 4.85 to 4.93 g/m$^3$), VC (density from 5.36 to 5.77 g/m$^3$), Zr (density of 6.66 g/m$^3$) and $Cr_3C_2$ (density from 6.68 to 6.74 g/m$^3$), and the second hard material is a material having larger specific gravity than that of the Fe-based mother phase metal:

Mo$_2$C (density of 9.18 g/m$^3$), TaC (density of 14.4 g/m$^3$), WC (density from 15.6 to 15.7 g/m$^3$), W$_2$C (density of 17.2 g/m$^3$).

Above combinations bring the specific gravity of entire wear resisting particles almost equal or close to that of the mother phase metal, thereby allowing the hard particles to almost uniformly disperse in the mother phase metal. As a result, non-uniformity of wear resisting performance caused by the cohesive of hard particles can be suppressed, the generation of cracks and separation at the agglutinated portion can be suppressed, and further the impact resistance can be improved.

The particle size of the wear resisting particles in Embodiment 1 is in a range from 0.2 to 9 mm. The lower limit of the particle size is specified to 0.2 mm because the particles smaller than 0.2 mm in size give surface tension larger than the gravity, which prevents the particles from entering the molten mother phase metal, thus letting the particles float on the surface of the mother phase metal. For example, when wear resisting particles having 0.1 mm in size are used to form a hardened buildup layer with 6 mm of excess metal height using the arc buildup welding, the wear resisting particles float on the surface of the buildup layer, as shown in. FIG. 1. An example of the condition of that buildup welding is given below.

Figure 2:
FIG. 2 is a schematic drawing of hardened buildup layer having 6 mm of excess metal height, formed by the arc buildup welding using wear resisting particles of 9 mm of particle size.

The upper limit of the particle size is specified to 9 mm because the normal height of excess metal is about 6 mm/single layer at the maximum for the case of forming the hardened buildup layer by the arc buildup welding. In this case, when the particle size is larger than 9 mm, these particles are exposed from the buildup hardened layer by one third or more in the size, which likely induces separation of the particles. For example, when wear resisting particles having 9 mm in size are used to form a hardened buildup layer with 6 mm of excess metal height using the arc buildup welding, the wear resisting particles are exposed by about 3 mm from the surface of the buildup layer, as shown in FIG. 2. An example of the condition of that buildup welding is given below.

[Example of Condition of Buildup Welding]

| | |
|---|---|
| Welding wire | Steel |
| Shield gas | Ar-20% CO$_2$ |
| Buildup welding current | 330 A |
| Buildup welding voltage | 34 V |
| Buildup welding speed | 20 cm/min |
| Buildup width | 25 mm |
| Excess metal height | 6 mm |
| Content of hard particles | 40% by volume |

The wear resisting particles are the material composed of the first hard material and the second hard material, and the material contains 60 to 96% by volume of carbide and balance of metal.

The reason that balance is specified to a metal is the following. The wear resisting particles are preferably manufactured by sintering. In that case, preferably a metal is used as the binder. Sintering allows obtaining uniform structure, which improves the toughness of the particles and improves the impact resistance thereof, thereby allowing manufacturing of the wear resisting particles difficult to be cracked or chipped.

The reason that the lower limit of the volume content of carbide is specified to 60% is the following.

The compound rule is assumed to hold true also to the hardness. If the hardness of carbide is expressed by Hc, the content of carbide is expressed by Vc, the hardness of binder is expressed by Hm, and the content of binder metal is expressed by (1−Vc), then the hardness H of the disperser of the wear resisting particles is expressed by the formula (11).

$$H=Hc \cdot Vc+Hm \cdot (1-Vc) \qquad (11)$$

The hardness of carbide, (Hc), is about Hv 1500 at the minimum, and the hardness of binder metal, (Hm), is about Hv 200. For the particle disperser to fully perform the wear resisting property, the hardness has to be at or higher than about Hv 1000 which is the hardness of silica sand (SiO$_2$). Therefore, assuming H>1000, then Vc>60%.

Figure 3:
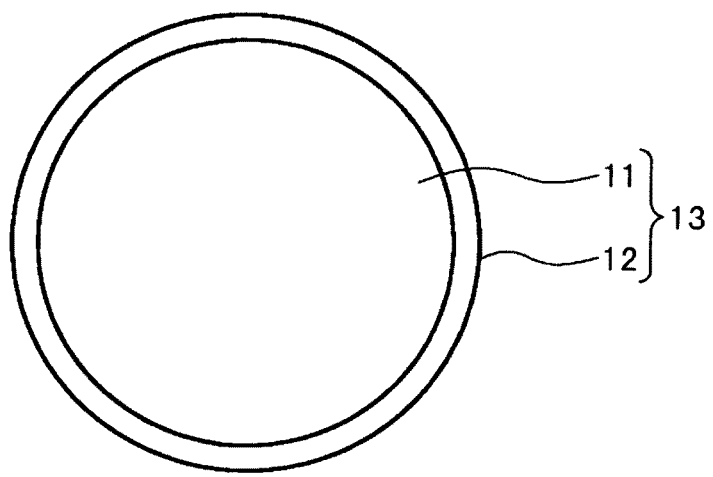
FIG. 3 shows the cross section of a wear resisting particle according to Embodiment 1 of the present invention.

The wear resisting particle of Embodiment 1 may be the one shown in FIG. 3. That is, the wear resisting particle 13 is in spherical shape or in near-spherical shape, and is structured by the base 11 and the coating layer 12 coating the base 11. Square particle likely induces poor fusion, and generates small pores to deteriorate the strength. Square corners intensify stress thereto, thus generating cracks and inducing lack of wear resisting particles. Therefore, spherical or near-spherical shape is preferred.

The coating layer 12 preferably has a thickness of 0.1 mm or less. By thinning the thickness of the coating layer 12, all the coating layer 12 is allowed to be eluted into the mother phase metal, thereby improving the wettability between the wear resisting particles and the mother phase metal, and adjusting the structure of the mother phase metal.

The reason for forming the coating layer 12 is that the coating layer is provided with easy deposition property owing to the improvement in the wettability with the mother phase metal, that the function of improving the binding force with the mother phase metal is provided, and that the function of dissolving the coating layer 12 in the mother phase metal is provided to alloy the mother phase metal and to harden thereof.

The coating layer 12 may be made of an alloy of any of Fe, Co, Ni, and Cu. This is to attain the effect of improvement of wettability and of improvement of binding force. The coating layer 12 may also be made of a thermet containing tungsten carbide. This is to attain the effect of improvement of wettability and of improvement of the hardness of the mother phase metal.

When the mother phase metal is a metal of Fe-based, Co-based, Ni-based, or Cu-based, and the main component of the base 11 is, for example, ceramics (TiCN and the like), the TiCN is poor in wettability with the molten metal, thus inducing poor deposition in some cases. To this point, by using the coating layer 12 which contains a Ni layer having good wettability to the mother phase metal, the wettability of the wear resisting particles 13 can be improved.

If the mother phase metal is steel, TiCN is poor in wettability, and is difficult to elute the ingredient into the mother phase metal. In this regard, when the coating layer 12 is WC—Co (Co is used as the binder), WC and Co show good wettability to the mother phase metal, thus W, C, and Co are eluted into the mother phase metal. Through the elution, the amount of C in the mother phase metal increases to form martensite, and the hardness remarkably increases to Hv 700 or larger. Also W forms a precipitate carbide in the mother phase metal, which increases the hardness of the mother phase metal, improves the softening-resistance against the temperature rise caused from the friction heat, and improves the wear resisting property.

Above wear resisting particles use a binder for the carbide, which binder is a metal binder of Co, Ni, Fe, Cr, Mo, or the like, while adding Mo, Mo$_2$C, and Cr as the modifier, thereby sintering them to provide high toughness hard particles. When that type of hard particles are dispersed to manufacture a wear resisting structure member, the lacking and dropping off of the hard particles can be suppressed. For example, when a single $W_2C$ as an example of the conventional hard particles is used, the $W_2C$ is poor in toughness, though the hardness is high. Thus, the particles likely induce lacking and dropping off from the wear resisting structure member. With the above high toughness hard particles, however, there occur very little lacking and dropping off thereof.

Use of TiC or TiCN as the material of wear resisting particles is advantageous in view of cost. Although tungsten is a rare metal produced mainly in China, and is very expensive, Ti is an element existing in a vast amount, and has smaller specific gravity than that of tungsten. Therefore, comparison in terms of volume leads the evaluation of inexpensive.

The next is the description about the role of material components used for the wear resisting particles.

Nitrogen in TiCN makes the carbide crystals fine, thus improving the strength of hard particles. Since TiCN is stable against Fe and is eluted very little, the particles tend to remain in non-melted state. Owing to, however, little elution of the components, there exists a condition that the hardness of mother phase metal increases only to about Hv 400, which induces the poor wear resisting property of the mother phase metal. Titanium has an advantage of making crystal grains of the mother phase metal fine, and contributes to the improvement of toughness of the wear resisting material. Although TiCN is eluted little, it is still eluted into the mother phase metal in fine crystal shape, thus the mother phase metal becomes a reinforced material with TiCN dispersion. The phenomenon presumably improves both the wear resisting property and the toughness.

Tungsten carbide improves the sintering property and improves the strength of hard particles. Also the tungsten carbide is eluted into the mother phase metal by an adequate amount to form martensite, thereby increasing the hardness of the mother phase metal and improves the wear resisting property.

Nickel which is used as the binder of carbide shows very high wettability to carbide which is the main component, and generates few sintering defects. The hardness can be adjusted by the amount of Ni. Increase in the amount of Ni decreases the hardness. An adequate amount of Ni is about 8%.

Cobalt which is used as the binder of carbide shows very high wettability to carbide which is the main component, and generates few sintering defects.

Chromium which is used as the binder or the modifier of carbide improves a deflective strength.

Molybdenum carbide ($Mo_2C$) which is used as the binder or the modifier of carbide improves the sintering property, deflective strength, and hardness with a small amount (3%) of addition.

Next, the method for manufacturing the wear resisting particle 13 shown in FIG. 3 is described.

First, acetone is added to the raw material of the base 11, for example to the powder of WC, TiC, Co, or Ni. The mixture is agitated and blended in a mill equipped with low-speed rotary blades, called the "attriter", for several tens of hours. After blending, the mixture is dried to prepare cake. The raw material in cake shape is then crushed. A mixed liquid of acetone and several percentages of paraffin-based lubricant are added to thus crushed raw material to form slurry. The slurry raw material is dried to give the granulated raw material. By utilizing the granules of raw material as the nuclei, they are rolled under vibration while dusting a powder of raw material over the granules, thus letting the granules grow to a desired particle size. In the final granulation step, the powder of raw material such as WC—Co for the coating layer 12, blended similar to above procedure, is dusted over the granules to form the coating layer. Thus formed wear resisting particles are held at about 500° C. for a while to let the lubricant evaporate, and then it is heated to a temperature of generating liquid phase. By holding the temperature, the sintering proceeds to obtain the wear resisting particles.

Embodiment 2

Figure 4:
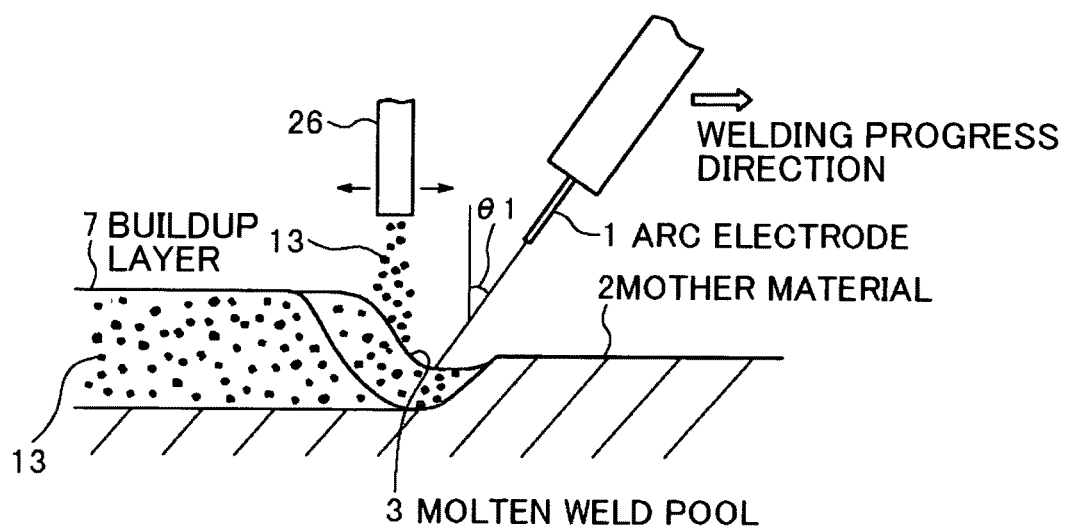
FIG. 4 is a schematic drawing illustrating a method for manufacturing the wear resisting structure member according to Embodiment 2 of the present invention.

FIG. 4 is a schematic drawing illustrating the method for manufacturing the wear resisting structure member according to Embodiment 2 of the present invention. FIG. 4 shows the mechanism of forming the buildup layer. By the mechanism, the wear resisting buildup layer is formed. According to the mechanism, the arc electrode 1 made of the welding wire projecting by 25 mm in length is positioned aslope at a tilt angle θ1 (torch angle=30°) to the right-angle direction of the mother material 2 made of the CrMo steel horizontally positioned. The welding current of the arc electrode 1 is 230 A, and the welding voltage thereof is 17 V, and the feed speed of the welding wire is 100 g/min. To the welding zone, 100% argon as the shield gas is supplied at a rate of 30 l/min. To the molten weld pool 3 being formed by the arc generated from the arc electrode 1, there are supplied the wear resisting particles 13 composed of, for example, 0.25 to 0.85 mm in size according to Embodiment 1, (the density is adjusted to almost equal to that of the mother material), through the nozzle 26. The nozzle 26 weaves (at 30 mm in amplitude of vibration) driven by triangular waves of 1.5 Hz in the direction of welding, or in the direction of this side to far side of the drawing of FIG. 4, thereby feeding the wear resisting particles 13 at a rate of 70 g/min.

Under the above conditions, the welding proceeds to the right-hand in the figure at a speed of 22 cm/min. The density of molten metal in the molten weld pool 3 before supplied with the wear resisting particles 13 is 7.8 $g/cm^3$.

As shown in FIG. 4, the wear resisting particles 13 are supplied at rear side (left side), in the direction of welding progress, from the position where the straight line extending the arc electrode 1 crosses the plane of the surface of the mother material 2. All of the coating layer 12 of the wear resisting particles 13 supplied to the molten weld pool 3 at about 1800° C. reacts with the molten metal, thus forming an alloy layer around the wear resisting particle 13, while the base 11 remains in the molten metal.

According to Embodiment 2, the wear resisting particles 13 are adjusted to have a specific gravity almost equal to that of the mother material 2. As a result, the cohesive of the wear resisting particles 13 can be suppressed, and the molten metal portion is solidified while suppressing segregation and settling of the wear resisting particles 13 and preventing segregation and floating thereof. Consequently, in the buildup layer 7 obtained from hardening, the wear resisting particles 13 are almost uniformly dispersed, and the buildup layer 7 has a favorable wear resisting property and an impact resistance.

If there is a difference in the specific gravity between the mother material 2 and the wear resisting particles 13, the torch angle θ1 of the arc electrode 1 is adjusted so as the wear resisting particles 13 to be almost uniformly dispersed in the buildup layer 7.

The following description is about the distribution of particles for the case that the wear resisting particles are almost uniformly dispersed in the wear resisting buildup layer of the wear resisting structure member as described above.

The uniform dispersion is attained by bringing the specific gravity of the wear resisting particles equal to that of the mother phase metal. Therefore, the uniformity can be confirmed by the distribution of the wear resisting particles in the vertical direction (almost the gravity direction).

The area of a cross section cut in the vertical direction (almost the gravity direction) for the wear resisting buildup layer is expressed by "Y". The cross section is divided into two halves: upper layer and lower layer, in the vertical direction by a line orthogonal to the almost gravity direction. The quantity of the wear resisting particles existing in the upper layer (area: Y/2) of the cross section is expressed by "a". The quantity of the wear resisting particles existing in the lower layer (area: Y/2) of the cross section is expressed by "b". The center cross sectional area of the wear resisting particle is expressed by "X". Then, the area percentage of the wear resisting particles in the upper layer, (upper layer area percentage), $S_{top}$ (abbreviated to St), and the area percentage of the wear resisting particles in the lower layer, (lower layer area percentage), $S_{bottom}$ (abbreviated to Sb), can be derived from the formulae (1) and (2). The index representing the uniform dispersion is St/Sb. If the index St/Sb is "1", complete uniform dispersion is attained. If the index St/Sb is "0", all the particles settle into the lower layer.

$$St=aX/(Y/2)=2aX/Y \quad (1)$$

$$Sb=bX/(Y/2)=2bX/Y \quad (2)$$

$$St/Sb=a/b \quad (3)$$

For the case of small quantity of the wear resisting particles in the wear resisting buildup layer, and for the case of large quantity thereof, the case of small quantity is more difficult to attain uniform dispersion, or to bring the uniform dispersion index St/Sb close to "1". Accordingly, the area percentage (total area percentage) S of the wear resisting particles to the entire cross section cut in the vertical direction of the wear resisting buildup layer can be derived by the formula (4). Compared with the case of large total area percentage S, if the total area percentage S is small, it is accepted that almost uniform dispersion is attained even when the uniform dispersion index St/Sb is far from "1".

$$S=(a+b)X/Y \quad (4)$$

Next, an example of dispersing the wear resisting particles having 1 mm in diameter is described.

Figure 5:
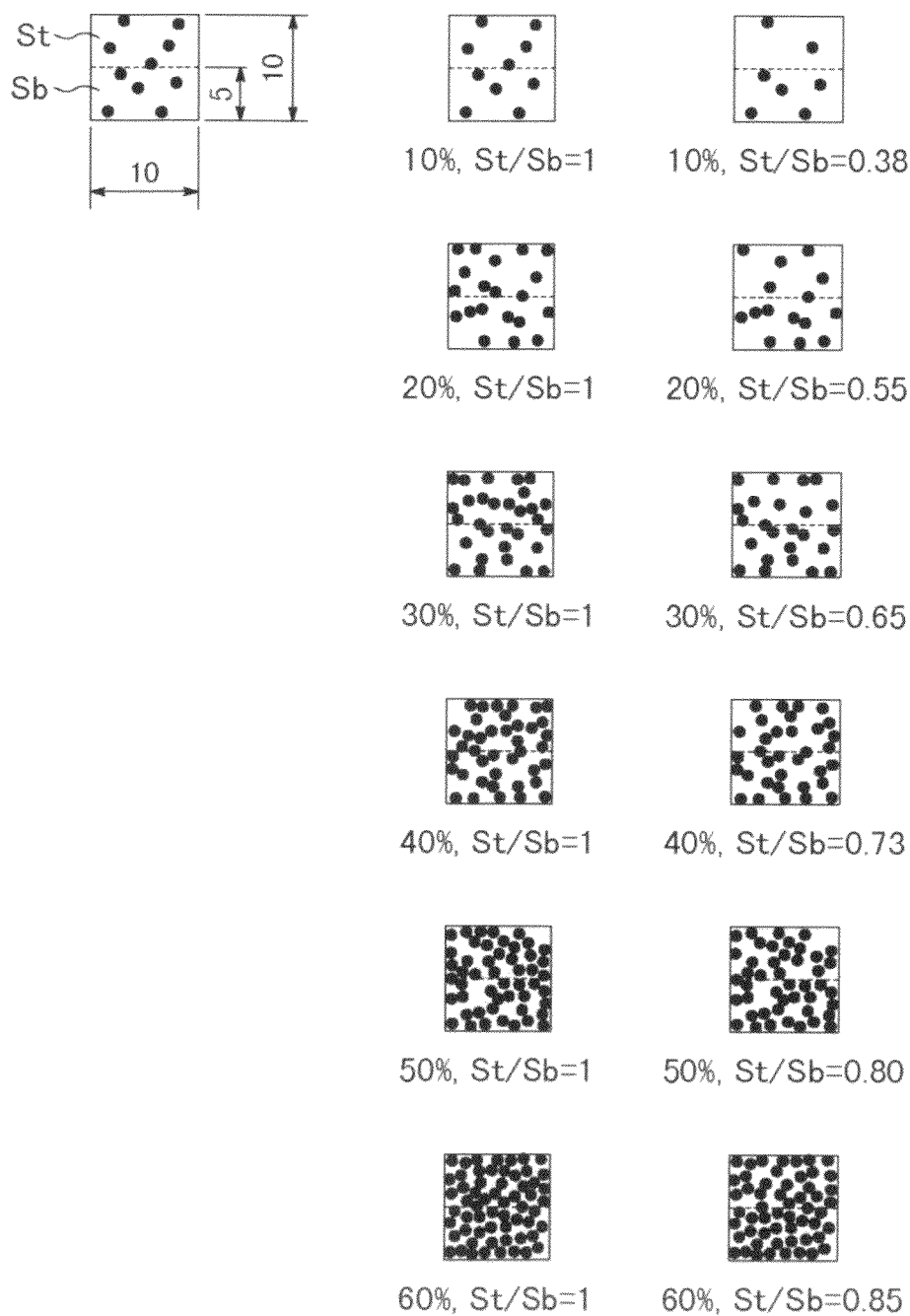
FIG. 5 shows cross sections indicating the distribution of wear resisting particles, in terms of the lowest (limit) uniform dispersion index St/Sb and the maximum uniform dispersion index St/Sb=1, assuming almost uniformly dispersed state, for a cross section of 10 mm square being cut in the vertical direction of the wear resisting buildup layer, under a condition of the total area percentage S of from 10 to 60%.

FIG. 5 shows cross sections indicating the distribution of wear resisting particles, in terms of the lowest (limit) uniform dispersion index St/Sb and the maximum uniform dispersion index St/Sb=1, assuming almost uniformly dispersed state, for a cross section of 10 mm square being cut in the vertical direction of the wear resisting buildup layer, under a condition of the total area percentage S of from 10 to 60%. The area Y of the area of the cross section cut in the vertical direction of the wear resisting buildup layer is 100 mm². The particle size φ is 1 mm. The center cross sectional area X of the wear resisting particle is 0.785398163 mm².

Table 1 lists the values to derive the limit uniform dispersion index St/Sb shown in FIG. 5, in terms of: total quantity of particles; total area percentage, S; quantity of particles in the upper layer; area percentage in upper layer, St; and area percentage in lower layer, Sb.

Figure 6:
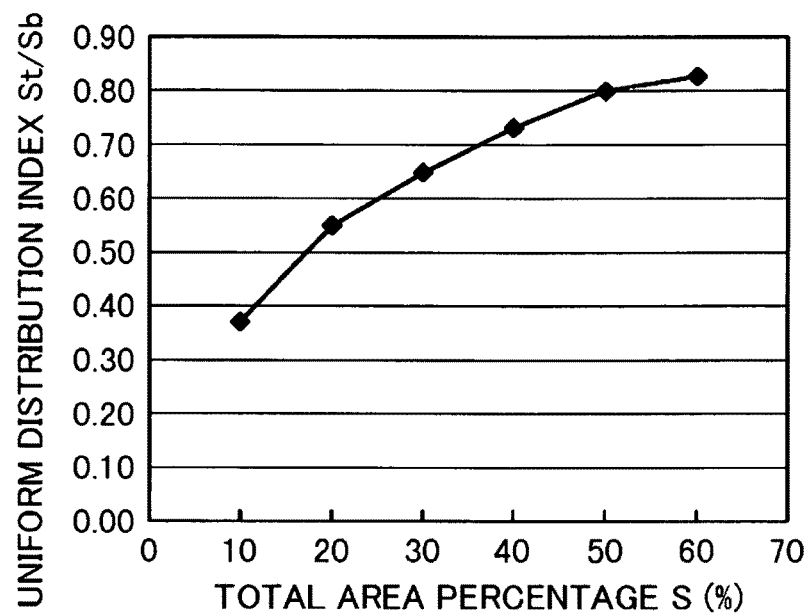
FIG. 6 is a graph showing the relationship between the total area percentage S and the limit uniform dispersion index St/Sb, given in Table 1.

FIG. 6 is a graph showing the relationship between the total area-percentage S and the limit uniform dispersion index St/Sb, given in Table 1.

TABLE 1

| | | Setting the limit of uniform dispersion | | | |
|---|---|---|---|---|---|
| Total quantity of particles | Total area percentage S | Quantity of particles in upper layer | Area percentage in upper layer, St | Area percentage in lower layer, Sb | St/Sb |
| 13 | 10% | 3.5 | 5% | 14% | 0.38 |
| 25 | 20% | 9 | 14% | 26% | 0.55 |
| 38 | 30% | 15 | 24% | 36% | 0.65 |
| 51 | 40% | 21 | 34% | 46% | 0.73 |
| 64 | 50% | 28 | 44% | 56% | 0.80 |
| 76 | 60% | 35 | 55% | 65% | 0.85 |

As shown in FIG. 5, FIG. 6, and Table 1, even when the specific gravity of the wear resisting particles is brought to equal to that of the mother phase metal, smaller total area percentage S makes the uniform dispersion index St/Sb smaller. Accordingly, if the uniform dispersion index is 0.38 or more, or between 0.38 and 0.85, the wear resisting particles are accepted as uniformly dispersed.

In detail, it is judged that, for the case that the total area percentage S is 10%, 0.38 or higher uniform dispersion index indicates almost uniform dispersion of the wear resisting particles, and the case that smaller than 0.38 of uniform dispersion index indicates non-uniform dispersion of the wear resisting particles. Similarly, for the cases of 20%, 30%, 40%, 50%, and 60% of total area percentages S, if the respective uniform dispersion indexes are 0.55 or more, 0.65 or more, 0.73 or more, 0.80 or more, and 0.85 or more, the wear resisting particles are accepted as almost uniformly dispersed, while the respective dispersion indexes are smaller than 0.55, smaller than 0.65, smaller than 0.73, smaller than 0.80, and smaller than 0.85, the wear resisting particles are judged as not-uniformly dispersed.

In more detail, against the total area percentage S, if the uniform dispersion index becomes above the limit uniform dispersion index graph of FIG. 6, the wear resisting particles are judged as almost uniformly dispersed, while the uniform dispersion index becomes below the limit uniform dispersion index graph of FIG. 6, the wear resisting particles are judged as not-uniformly dispersed.

The hardnesses of the upper layer and the lower layer in the mother phase metal of the wear resisting buildup layer are preferably in a range from Hv 700 to Hv 1000, respectively.

Embodiment 3

Figure 7:
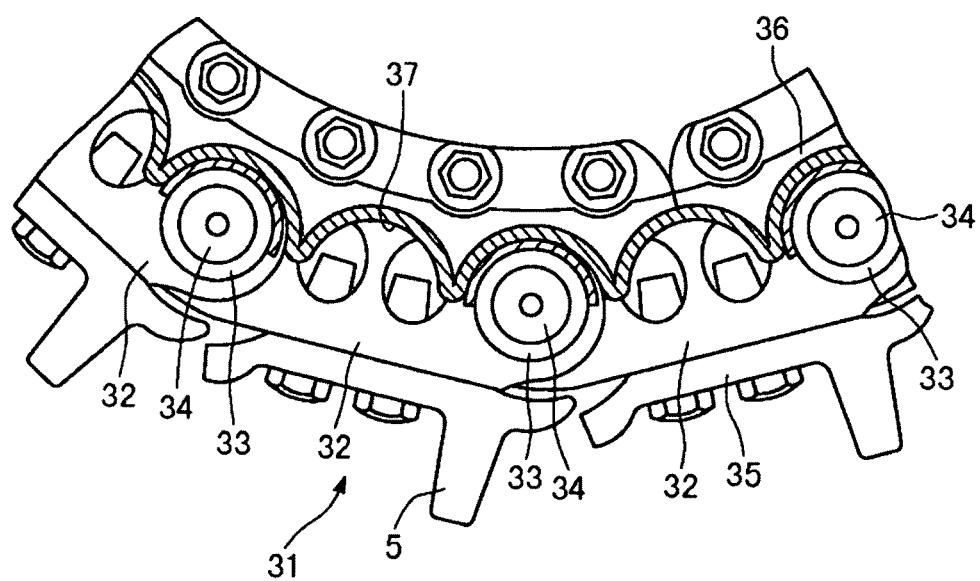
FIG. 7 shows a partially enlarged cross sectional view of an underbody part of a bulldozer according to Embodiment 3 of the present invention.

FIG. 7 shows a partially enlarged cross sectional view of an underbody part of a bulldozer according to Embodiment 3 of the present invention. Embodiment 3 uses the hard particles similar to those of the wear resisting particles in Embodiment 1.

According to Embodiment 3, a crawler track 31 is structured by forming a link chain by pressing-in an end of a bush 33 into the respective holes on an opposing pair of links 32, 32 and by pressing-in both ends of a crawler track pin 34 penetrating the bush 33 into the front and rear links 32, 32 then by fixing a track shoe 35 to the link chain. In this manner, the crawler track 31 winds around a sprocket 36 and an idler (not shown). By driving the sprocket 36, a tooth groove 37 of the sprocket 36 mates with the bush 33. By the movement of the bush 33 over the tooth face of the sprocket 36 in sliding mode, the crawler track 31 rotates, thus making the bulldozer drive.

During the drive of the bulldozer, the tooth face of the sprocket 36 and the bush 33 are operated under repeated sliding contact with inclusions of sand, soil, and rock therebetween. Accordingly, each surface of the sprocket 36 and the bush 33, works under an extremely abrasive condition. In this respect, the buildup welding is applied to necessary portions of the tooth of the sprocket 36 and the outer periphery of the bush 33 to improve the wear resisting property.

Figure 8:
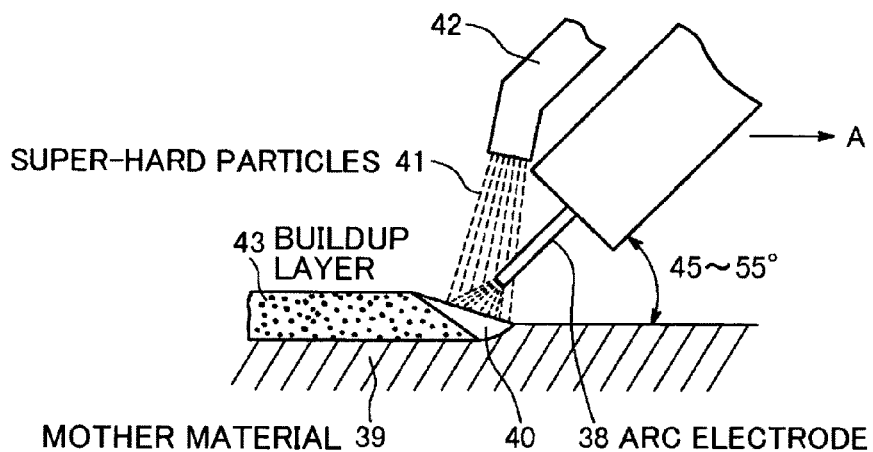
FIG. 8 illustrates the mechanism of forming buildup layer.

On forming the wear resisting buildup layer, as shown in FIG. 8, an arc electrode 38 made of a welding wire (for example, "KC-50" of KOBE JFE Welding) is positioned aslope at a tilt angle with a specified torch angle (45° to 55°) to the surface of a mother material 39 horizontally positioned. To the welding zone, 100% argon as the shield gas is supplied. To a molten weld pool 40 being formed by the arc generated between the arc electrode 38 and the mother material 39, there are supplied wear resisting particles 41 via a nozzle 42. The welding proceeds to the arrow A direction at a specified speed to form a buildup layer 43 on the surface of the mother material 39. In that case, it is preferable that the dropping point of the hard particles 41 be regulated to be directly above the arc, not to be dropped short of the arc, in order to prevent the hard particles 41 from exposing above the surface of the buildup layer 43 and in order to establish dense and uniform distribution of the hard particles deep in the buildup layer 43.

Next is the detail description about the method for forming buildup layer for each of the parts of sprocket 36 and bush 33.

Figure 9:
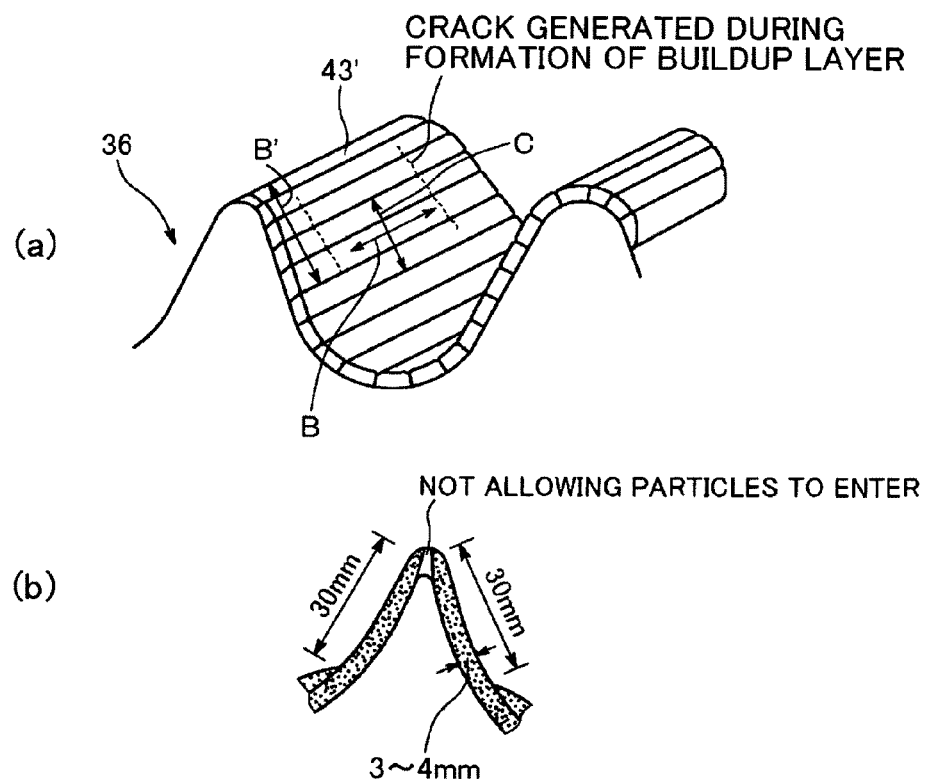
FIGS. 9(a) and 9(b) illustrate the state of forming the buildup layer of a sprocket.

For the method of forming the buildup layer on the sprocket 36, specifically for forming the buildup layer on the teeth of the sprocket 36 (sprocket teeth), the mating face to the bush 33 and the tooth tip of the sprocket 36 are treated by total buildup, as shown in FIG. 9(a), in the direction of crossing the rotational direction of the sprocket 36, preferably in the orthogonal direction (the arrow B direction). For each tooth face, it is preferable that the buildup layer is sequentially formed in parallel in the direction from the tooth tip to the tooth root, (in the arrow C direction) from the standpoint of attaining uniform bead appearance and of stabilizing the quality of buildup layer. If the buildup layer is formed in the inverse direction, or in the direction from the tooth root to the tooth tip (in the inverse direction to the arrow C direction), the weld heat accumulates in the mother material, which increases the temperature at the tooth tip, and varies the penetration depth, the content and distribution of particles, and the structure of mother phase metal, thereby failing in continuously forming the buildup layer. As illustrated in FIG. 9(b), in the zone near the tooth tip, (about 30 mm), the height of the excess metal is preferably brought to lower than that of other portions, (by 3 to 4 mm), and not adding the hard particles to the tooth tip in order to prevent lack of buildup layer. Furthermore, it is preferable that the hard particles be supplied by increasing the content thereof at intermediate portion between the tooth root and the tooth tip higher than the content at tooth root and the tooth tip.

By regulating the distribution of the buildup layer and the distribution of the hard particles, as described above, the tooth root and the tooth tip can be provided mainly with toughness, while the intermediate portion between the tooth root and the tooth tip can be provided mainly with wear resisting property. Thus the separation and chipping of the tooth tip can be prevented to stabilize the durability of the buildup layer. During formation of the buildup layer, the buildup layer may generate cracks in the direction orthogonal to the bead, as shown in FIG. 9(a). Since, however, the direction of crack generation agrees with the direction of generation of tensile stress (in the arrow B' direction) in the mating state, the opening of the crack can be prevented.

Figure 10:
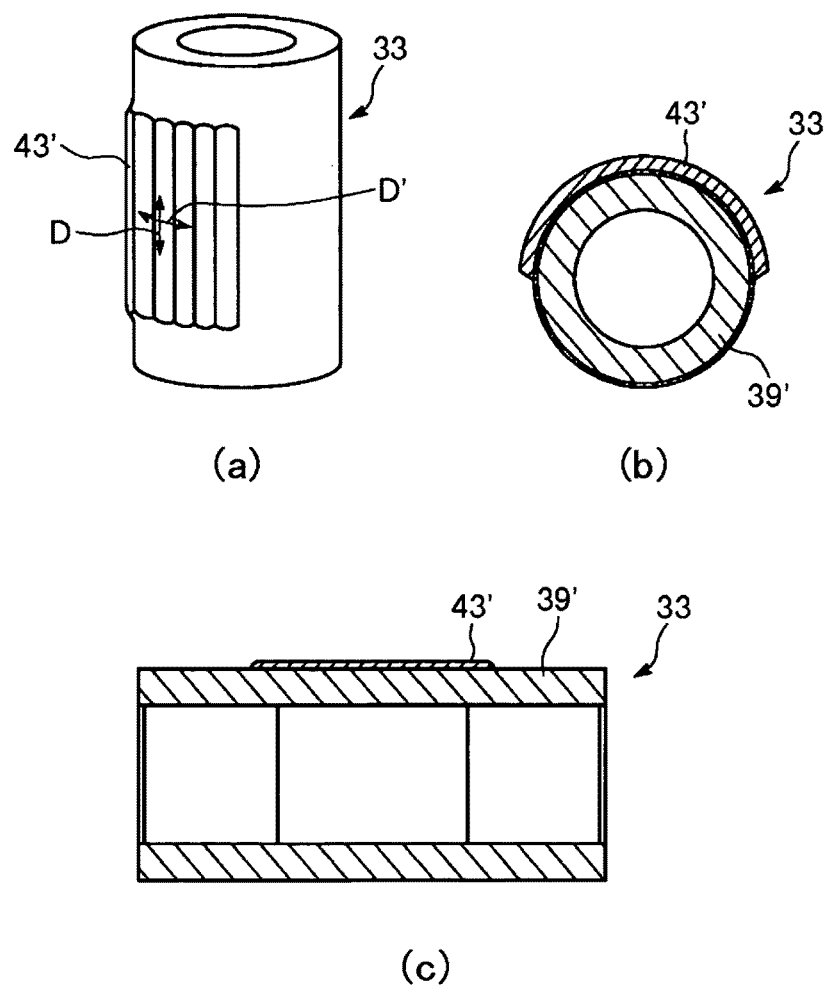
FIGS. 10(a), 10(b), and 10(c) illustrate the state of forming the buildup layer of a bush.

Regarding the method for forming the buildup layer on the bush 33, specifically for forming the buildup layer at outer periphery of the bush 33, as illustrated in FIG. 10, buildup is applied to approximately half circumference of the outer periphery of the bush as the mating face to the sprocket 36, in the direction of crossing the rotational direction of the sprocket 36 (in the sliding direction of the bush 33 (in the arrow D' direction of FIG. 10(a))), preferably in the orthogonal direction (the arrow D direction). When the range of forming the buildup layer is over the whole circumference of the outer periphery of the bush, the thermal stress and the transformation stress generated during the formation of the buildup layer have no releasing area, thus raising disadvantages of deformation of the mother material and generation of cracks. To the contrary, when the buildup layer is formed only on the necessary portions, as in the case of Embodiment 3, there arises an advantage of eliminating the process on inner diameter of the bush mother material after forming the buildup layer. The range of forming the buildup layer is not limited to about half circumference (180°) as in Embodiment 3, but may be in a range of minimum necessary angles (for example, 120°).

Embodiment 4

Figure 11:
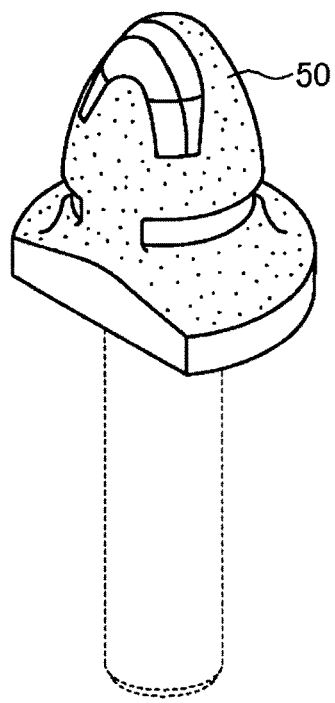
FIG. 11 is a front view of an impactor of a crusher according to Embodiment 4 of the present invention.
Figure 12:
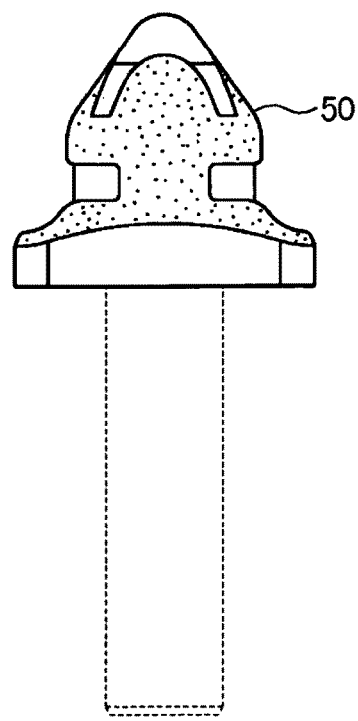
FIG. 12 shows a rear view of the impactor of the crusher of FIG. 11.

FIG. 11 is a front view of the impactor according to Embodiment 4 of the present invention. FIG. 12 shows a rear view of the impactor of the crusher of FIG. 11. Embodiment 4 uses the hard particles similar to the wear resisting particles in Embodiment 1.

The impactor is used mainly for crushing industrial waste such as wood. The satin portion in FIG. 11 and FIG. 12 indicates a buildup layer 50 of hard particles to improve the wear resisting property. In addition, a super-hard material is fitted to the tip portion. A part of the flange is removed to form a flat portion. The impactor is mounted to a rotary hammer or the like while facing the flat portion downward, thus impacting wood or the like to crush.

Embodiment 5

Figure 13:
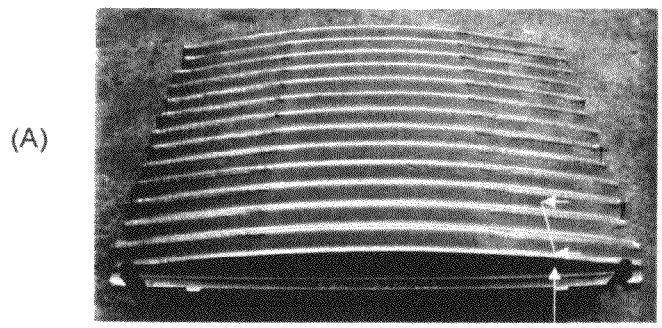
FIG. 13(A) shows tooth plates of a crusher according to Embodiment 5 of the present invention.
FIG. 13(B) shows the cross sectional structure of a tooth of the tooth plate given in FIG. 13(A).
Figure 13:
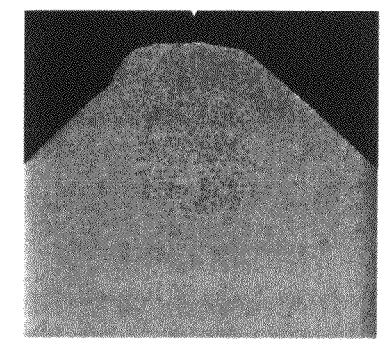

FIG. 13(A) shows tooth plates of a crusher according to Embodiment 5 of the present invention, and FIG. 13(B) shows the cross sectional structure of a tooth of the tooth plate shown in FIG. 13(A). Embodiment 5 uses the wear resisting material similar to that of the wear resisting particles in the Embodiment 1.

The crusher is used for crushing mainly industrial waste such as concrete waste and asphalt using teeth plates. As shown in FIG. 13(B), a wear resisting material is inserted and deposited inside the tooth of the tooth plate.

The present invention is not limited to the above embodiments, and various modifications can be applied within a range not departing from the gist of the present invention. For instance, even when the wear resisting particles of Embodiment 1 or Embodiment 2 is applied to cast-in insertion process, the penetration of molten metal is readily obtained by selecting a coating layer having good wettability.

When the wear resisting particles of the Embodiment 1 or Embodiment 2 are used for manufacturing cast, the obtained cast has uniformly dispersed wear resisting particles therein by adding the wear resisting particles having almost equal specific gravity to that of the molten metal to the molten metal and by agitating them. Thus obtained cast may be directly used as the wear resisting parts, or may be mounted to a necessary portion by welding or by bolting.

Above embodiments use an Fe-based material as the mother phase metal. The present invention, however, is not limited to the Fe-based material, and may use other materials as the mother phase metal, such as Ni-based one (for example, colmonoy), Co-based one (for example, stellite), and Cu-based one (for example, aluminum bronze and phosphor bronze). In that case, as the main component of the first hard material, niobium carbide (NbC, density of 7.82 g/m³) or the like may be used other than above.

Other than Embodiments 3 to 5, the wear resisting particles may be used for shearing edge, cheek plate, waste feeder bar, and bit of crusher; shoe lug of bulldozer; bucket,, tooth adapter, lip, shroud between teeth, and corner guard of hydraulic excavator; cutting edge, end bit, tooth, ripper point, protector, wear plate, and shank of GET (Ground Engaging Tool) parts; and chopper of iron ring of trash compactor.

EXAMPLES

The examples of the present invention will be described below.

Example 1

Figure 14:
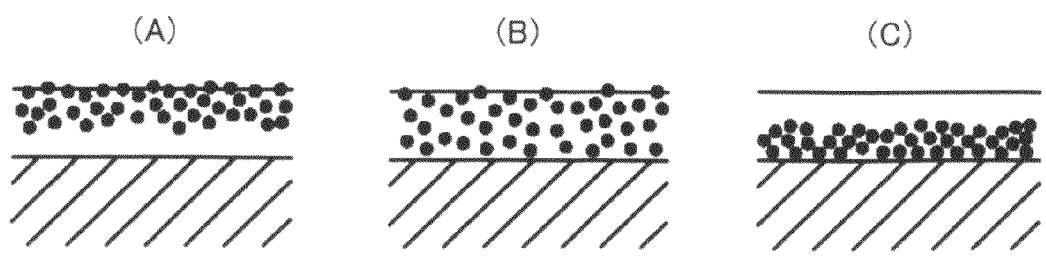
FIG. 14(A) is a schematic drawing of a comparative example of wear resisting particles having smaller specific gravity than that of the mother phase metal.
FIG. 14(B) is a schematic drawing of an example of wear resisting particles having almost equal specific gravity to that of the mother phase metal.
FIG. 14(C) is a schematic drawing of a comparative example of wear resisting particles having larger specific gravity than that of the mother phase metal.

FIG. 14(A) is a schematic drawing showing a state of dispersing the wear resisting particles having smaller specific gravity than that of the mother phase metal in the mother phase metal, (Comparative Example). FIG. 14(B) is a schematic drawing showing a state of dispersing the wear resisting particles having almost equal specific gravity to that of the mother phase metal in the mother phase metal, (Example). FIG. 14(C) is a schematic drawing showing a state of dispersing the wear resisting particles having larger specific gravity than that of the mother phase metal in the mother phase metal, (Comparative Example).

The composition of the wear resisting particles shown in FIG. 14(A) is TiC-50Ni by weight percent, giving a specific gravity of 5.9. The mother phase metal is CrMo steel, having a specific gravity of 7.8. Accordingly, the TiC-50Ni particles are dispersed in the mother phase metal while concentrated in the upper layer thereof.

The composition of the wear resisting particles shown in FIG. 14(B) is 39TiC-43WC-10Ni-5Cr-3Co by weight percent, giving a specific gravity of 7.7. The mother phase metal is CrMo steel, having a specific gravity of 7.8. Since the specific gravity of the wear resisting particles is almost equal to that of the mother phase metal, the particles of 39TiC-43WC-10Ni-5Cr-3Co can be dispersed almost uniformly in the mother phase metal.

The composition of the wear resisting particles shown in FIG. 14(C) is WC-7Co by weight percent, giving a specific gravity of 4.5. The mother phase metal is CrMo steel, having a specific gravity of 7.8. Accordingly, the WC-7Co particles are dispersed in the mother phase metal while concentrated in the lower layer thereof.

The wear resisting particles of Example 1 according to the present invention is a material containing the first hard material and the second hard material, specifically it is preferred to use the first hard material and the second hard material listed in Table 2 to the deposited metal (mother phase metal) respectively listed in Table 2, and it is preferable to use the respective wear resisting particles listed in Table 2. With that kind of wear resisting particles, the specific gravity of the deposited metal can be made almost equal to that of the wear resisting particles.

TABLE 2

| Deposited metal | | Anti-wear particles | | | | | Ratio of specific gravity to that of deposited metal |
|---|---|---|---|---|---|---|---|
| Material | Specific gravity | First hard material | Second hard material | Composition (weight ratio) | Composition (volume ratio) | Specific gravity | |
| SS400 | 7.8 | TiC | WC | 39TiC—43WC—10Ni—5Cr—3Co | 61TiC—22WC—9Ni—5Cr—3Co | 7.7 | 0.99 |
| | | TiCN | WC | 43TiCN—43WC—8Ni—3Cr—3Co | 65TiCN—22WC—7Ni—3Cr—3Co | 7.8 | 1.00 |
| | | VC | WC | 64VC—19WC—8Ni—7Cr—3Co | 45VC—37WC—9Ni—6Cr—4Co | 7.8 | 1.00 |
| | | Cr₃C₂ | WC | 64Cr₃C₂—19WC—8Ni—7Cr—4Co | 75Cr₃C₂—11WC—3Ni—10Cr—1Co | 7.8 | 1.00 |
| | | TiC | Mo₂C | 19TiC—69Mo₂C—9Ni—3Cr | 30TiC—59Mo₂C—8Ni—3Cr | 7.8 | 1.00 |
| | | TiC | WC | 60TiC—23WC—10Ni—5Cr—2Co | 77TiC—10WC—7Ni—4Cr—1Co | 6.35 | 0.81 |
| | | TiC | WC | 55TiC—28WC—10Ni—5Cr—2Co | 74TiC—12WC—7Ni—5Cr—2Co | 6.64 | 0.85 |
| | | TiC | WC | 22TiC—59WC—8Ni—7Cr—4Co | 42TiC—36WC—8Ni—9Cr—5Co | 9.36 | 1.20 |
| | | TiC | WC | 20TiC—60WC—8Ni—7Cr—5Co | 39TiC—38WC—9Ni—9Cr—5Co | 9.6 | 1.23 |
| SCMnH11 | 7.96 | TiC | WC | 36TiC—46WC—10Ni—5Cr—3Co | 36TiC—46WC—10Ni—5Cr—3Co | 7.9 | 0.99 |
| | | TiCN | WC | 41TiCN—45WC—8Ni—3Cr—3Co | 63TiCN—23WC—7Ni—3Cr—3Co | 7.96 | 1.00 |
| | | VC | WC | 44VC—38WC—14Ni—1Cr—3Co | 64VC—20WC—13Ni—1Cr—3Co | 7.96 | 1.00 |
| | | Cr₃C₂ | WC | 64Cr₃C₂—22WC—10Ni—2Cr—2Co | 76Cr₃C₂—12WC—9Ni—2Cr—2Co | 7.97 | 1.00 |
| | | TiC | Mo₂C | 16TiC—72Mo2C—7Ni—5Cr | 26TiC—62Mo2C—6Ni—6Cr | 7.95 | 1.00 |
| | | TiC | WC | 56TiC—27WC—7Ni—8Cr—2Co | 74TiC—12WC—5Ni—7Cr—2Co | 6.54 | 0.82 |
| | | TiC | WC | 53TiC—30WC—11Ni—4Cr—2Co | 73TiC—13WC—8Ni—4Cr—2Co | 6.77 | 0.85 |
| | | TiC | WC | 20TiC—60WC—6Ni—9Cr—5Co | 39TiC—38WC—6Ni—12Cr—5Co | 9.55 | 1.20 |
| | | TiC | WC | 19TiC—61WC—10Ni—5Cr—5Co | 38TiC—39WC—11Ni—7Cr—5Co | 9.77 | 1.23 |
| Hastelloy C | 8.9 | TiC | WC | 27TiC—58WC—12Ni—3Cr—4Co | 49TiC—31WC—12Ni—4Cr—4Co | 8.9 | 1.00 |
| | | TiCN | WC | 30TiCN—55WC—6Ni—5Cr—4Co | 52TiCN—32WC—6Ni—6Cr—4Co | 8.9 | 1.00 |
| | | VC | WC | 33VC—47WC—15Ni—4Co | 54VC—28WC—15Ni—4Co | 8.9 | 1.00 |
| | | Cr₃C₂ | WC | 47Cr3C2—38WC—8Ni—4Cr—3Co | 62Cr3C2—22WC—8Ni—5Cr—3Co | 8.9 | 1.00 |
| | | TiC | Mo₂C | 3TiC—87Mo2C—9Ni—1Cr | 5TiC—84Mo2C—9Ni—1Cr | 8.9 | 1.00 |
| | | TiC | WC | 44TiC—38WC—6Ni—9Cr—3Co | 65TiC—18WC—5Ni—9Cr—2Co | 7.3 | 0.82 |
| | | TiC | WC | 42TiC—40WC—14Ni—1Cr—3Co | 65TiC—20WC—12Ni—1Cr—3Co | 7.57 | 0.85 |
| | | TiC | WC | 12TiC—68WC—7Ni—8Cr—5Co | 26TiC—47WC—8Ni—12Cr—6Co | 10.67 | 1.20 |
| | | TiC | WC | 11TiC—69WC—11Ni—4Cr—5Co | 24TiC—49WC—14Ni—6Cr—7Co | 10.95 | 1.23 |
| Stellite | 8.48 | TiC | WC | 30TiC—51WC—7Ni—8Cr—4Co | 52TiC—28WC—7Ni—9Cr—4Co | 8.48 | 1.00 |
| | | TiCN | WC | 35TiCN—50WC—8Ni—3Cr—4Co | 57TiCN—28WC—8Ni—4Cr—4Co | 8.48 | 1.00 |
| | | VC | WC | 37VC—45WC—13Ni—2Cr—3Co | 57VC—25WC—12Ni—2Cr—3Co | 8.47 | 1.00 |
| | | Cr₃C₂ | WC | 54Cr3C2—32WC—8Ni—4Cr—2Co | 68Cr3C2—18WC—8Ni—5Cr—2Co | 8.47 | 1.00 |
| | | TiC | Mo₂C | 8TiC—80Mo2C—8Ni—4Cr | 14TiC—74Mo2C—8Ni—5Cr | 8.48 | 1.00 |
| | | TiC | WC | 50TiC—33WC—10Ni—5Cr—2Co | 71TiC—15WC—8Ni—5Cr—2Co | 6.95 | 0.82 |

TABLE 2-continued

| | | | | | | | |
|---|---|---|---|---|---|---|---|
| | | TiC | WC | 46TiC—36WC—9Ni—6Cr—3Co | 67TiC—17WC—7Ni—6Cr—2Co | 7.2 | 0.85 |
| | | TiC | WC | 16TiC—64WC—10Ni—5Cr—5Co | 33TiC—43WC—11Ni—7Cr—6Co | 10.17 | 1.20 |
| | | TiC | WC | 14TiC—66WC—9Ni—6Cr—5Co | 30TiC—45WC—11Ni—9Cr—6Co | 10.43 | 1.23 |
| High strength brass | 7.9 | TiC | WC | 37TiC—45WC—9Ni—6Cr—3Co | 59TiC—23WC—8Ni—7Cr—3Co | 7.9 | 1.00 |
| | | TiCN | WC | 42TiCN—44WC—9Ni—2Cr—3Co | 64TiCN—23WC—8Ni—2Cr—3Co | 7.9 | 1.00 |
| | | VC | WC | 44VC—38WC—10Ni—5Cr—3Co | 63VC—20WC—9Ni—5Cr—3Co | 7.9 | 1.00 |
| | | $Cr_3C_2$ | WC | 64$Cr_3C_2$—22WC—6Ni—6Cr—2Co | 75$Cr_3C_2$—12WC—5Ni—7Cr—2Co | 7.9 | 1.00 |
| | | TiC | $Mo_2C$ | 17TiC—71$Mo_2$C—7Ni—5Cr | 27TiC—61$Mo_2$C—6Ni—5Cr | 7.9 | 1.00 |
| | | TiC | WC | 58TiC—25WC—11Ni—4Cr—2Co | 76TiC—11WC—8Ni—4Cr—1Co | 6.48 | 0.82 |
| | | TiC | WC | 53TiC—32WC—12Ni—3Cr—2Co | 72TiC—14WC—9Ni—3Cr—2Co | 6.72 | 0.85 |
| | | TiC | WC | 21TiC—60WC—8Ni—7Cr—4Co | 40TiC—37WC—9Ni—9Cr—5Co | 9.48 | 1.20 |
| | | TiC | WC | 19TiC—61WC—8Ni—7Cr—5Co | 38TiC—39WC—9Ni—9Cr—5Co | 9.72 | 1.23 |

| Hard material | Specific gravity | Binder | Specific gravity |
|---|---|---|---|
| TiC | 4.92 | Ni | 8.9 |
| VC | 5.48 | Cr | 7.2 |
| $Cr_3C_2$ | 6.74 | Co | 8.85 |
| WC | 15.77 | | |
| $Mo_2C$ | 9.18 | | |
| TiCN | 5.17 | | |

Examples of wear resisting particles applied to Ni-based mother phase metal such as Hastelloy C (Ni-16Mo-15.5Cr-5Fe-3W-1Co, specific gravity of 8.9) are 54WC-27TiC-10Ni-5Cr-3Co (weight ratio) and 31WC-49TiC-10Ni-6Cr-4Co (volume ratio), giving a specific gravity of 8.8.

Hastelloy C shows excellent corrosion resistance to both oxidizing acids and reducing acids, and to salts, and is used in a wide range of chemical facilities. Specifically, Hastelloy C is one of a few materials enduring wet chlorine gas, salts of hypochlorite, and chlorine dioxide, thus Hastelloy C is used in petrochemicals, hydrochloric acid-based acid washing facilities, oil well parts, and the like. To prevent abrasion by cavitations of corrosion-resistant parts (such as pump) adopting Hastelloy C, the wear resisting particles according to the present invention are dispersed therein.

Examples of the wear resisting particles applied to Co-based mother phase metal such as Stellite #1 (Co-30Cr-12W-2.5C, specific gravity of 8.48) are 50Wc-31TiC-10Ni-5Cr-4Co (weight ratio) and 28WC-53TiC-9Ni-6Cr-4Co (volume ratio), giving a specific gravity of 8.44.

Stellite #1 is made by a dendritic crystal of Co—Cr—W alloy and a eutectic structure of $Cr_7C_3$+Co—Cr—W alloy. The characteristics of Stellite #1 are small decrease in the hardness at high temperatures, and excellent corrosion resistance against varieties of acids such as nitric acid, oxalic acid, citric acid, formic acid, and lactic acid. Stellite alloys do not vary the hardness and do not change the wear resisting property after post-heat treatment. Owing to the characteristics, Stellite alloys are used in varieties of parts as the buildup material for anti-corrosion and wear resisting service over a wide range of temperatures from cold to hot zones. Stellite #1 is applied to pressure impellers of disintegrator (wet crushing pump) which is a kind of wet crusher having functions of finely and uniformly crushing solid in liquid, thus transfer as a homogeneous solid-liquid mixture.

Examples of the wear resisting particles applied to Cu-based mother phase metal such as high strength brass cast (55 to 60 Cu, 0.5 to 2.0 Fe, 30 to 42 Zn, 0.1 to 3.5 Mn, and 0.5 to 2.0 Al, specific gravity of 7.9) are 45WC-37TiC-10Ni-5Cr-3Co (weight ratio) and 23Wc-59TiC-9Ni-5Cr-3Co (volume ratio), giving a specific gravity of 7.9.

The high strength brass cast is an alloy of Cu and Zn as the base components, with special elements of Al, Fe, Mn, Ni, and the like. This as-cast alloy has high strength and hardness without need of heat treatment, and is a material as the extremely excellent copper alloy. The alloy has good mechanical properties and excellent wear resisting property and thermal conductivity, further gives good casting ability with relatively low cost. The high strength brass cast is used for nut, gear, wear resisting plate, sliding parts operated at low speed and under heavy load, large valve, stem, bush (bearing), cam, hydraulic cylinder parts, slipper for rolling mill, and parts of construction machine.

Examples of the wear resisting particles applied to high Mn steel mother phase metal such as JIS SCMnH11 (specific gravity of 7.96) are 46WC-36TiC-10Ni-5Cr-3Co (weight ratio) and 24WC-58TiC-9Ni-6Cr-3Co (volume ratio), giving a specific gravity of 7.99.

The high Mn steel mother phase metal is used for wear parts subjected to impaction, such as crushing tooth, cheek plate, cone, and impact plate of crusher.

Example 2

Figure 15:
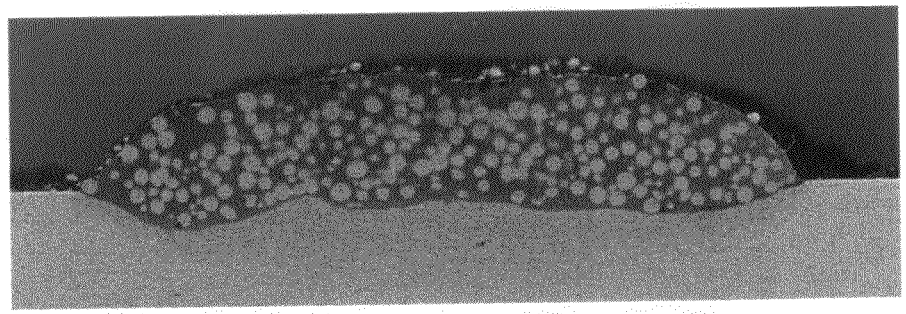
FIG. 15 shows a cross sectional view of a wear resisting structure member of Example 2.

FIG. 15 shows a cross sectional view of a wear resisting structure member of Example 2. The wear resisting structure member uses the wear resisting particles similar to those of the Embodiment 1 shown in FIG. 3, and forms the wear resisting buildup layer using the manufacturing method similar to that of the Embodiment 2 shown in FIG. 4. Therefore, detail description thereof is not given here.

The mother material 2 is CrMo steel. The welding wire is mild steel. The shield gas is Ar-20% $CO_2$. The welding is done at 230 A of welding current and 17V of welding voltage. The wear resisting particles 13 are composed of TiCN as the base 11, and WC as the coating layer 12, thus preparing particles of 46TiCN-8Ni-47 (WC-7Co). The size of the particles is in a range from 0.25 to 0.85 mm, with a specific gravity of 7.82.

According to Example 2, the cohesive of wear resisting particles can be suppressed by adjusting the specific gravity of the wear resisting particles 13 to almost equal to that of the mother material 2, thereby confirmed that the wear resisting particles 13 can be dispersed almost uniformly in the buildup layer formed by hardening.

Figure 16:
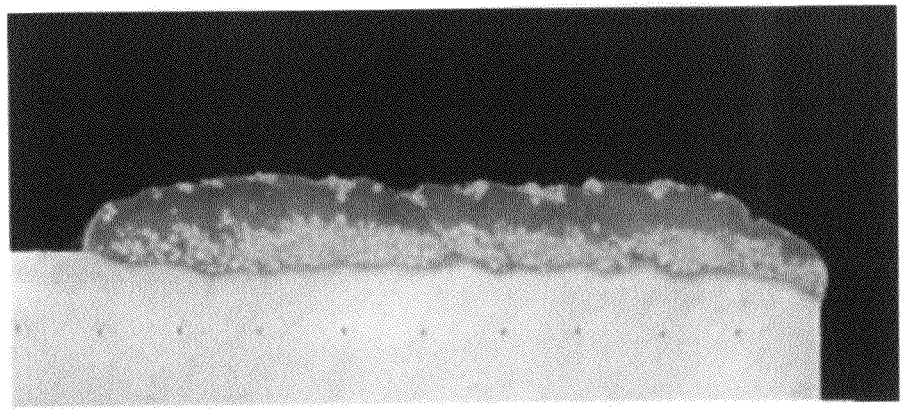
FIG. 16 shows a cross sectional view of a wear resisting structure member as a comparative example to Example 2.

FIG. 16 shows a cross sectional view of a wear resisting structure member as a comparative example to Example 2. The wear resisting structure member forms the wear resisting buildup layer using the manufacturing method similar to that of Embodiment 2 given in FIG. 4. However, the wear resisting particles are WC-8Co particles which are the conventional hard particles, and the size of the particles is in a range from 0.25 to 0.85 mm, with a specific gravity of 14.5.

The above comparative example results in settling and cohesive of the hard particles at lower part of the buildup layer. As a result, it was confirmed that uniform dispersion cannot be attained unless the specific gravity of the hard particles agrees with that of the mother material.

Figure 17:
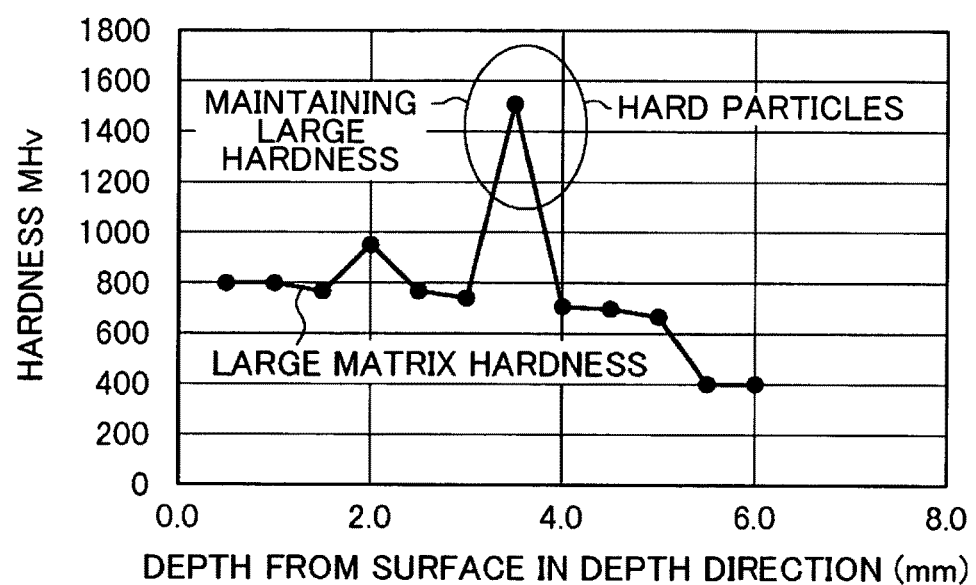
FIG. 17 is a graph showing the relationship between the distance in the depth direction of the buildup layer and the hardness for the wear resisting structure member of Example 2 given in FIG. 15.

FIG. 17 shows the observed hardness of the buildup layer of the wear resisting structure member of the Example 2 in FIG. 15, in the depth direction from the surface thereof. FIG. 17 is a graph showing the relationship between the distance in the depth direction of the buildup layer and the hardness for the buildup layer of the wear resisting structure member.

According to FIG. 17, the hardness of the buildup layer over the upper layer to the lower layer is in a range from Hv 700 to Hv 1000, which confirms that the buildup layer maintains high hardness.

Figure 18:
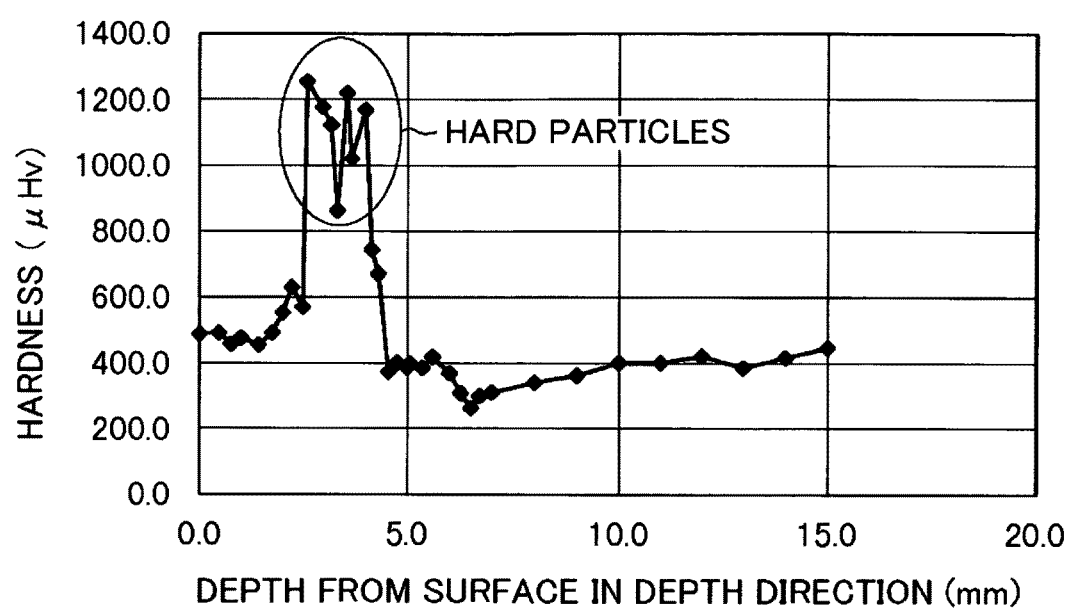
FIG. 18 is a graph showing the relationship between the distance in the depth direction of the buildup layer and the hardness for the wear resisting structure member of the comparative example shown in FIG. 16.

FIG. 18 shows the observed hardness of the buildup layer of the wear resisting structure member of the comparative example in FIG. 16, in the depth direction from the surface thereof. FIG. 18 is a graph showing the relationship between the distance in the depth direction of the buildup layer and the hardness for the buildup layer of the wear resisting structure member.

According to FIG. 18, the hardness of the upper layer in the buildup layer is lower than Hv 700, which confirms that the upper layer cannot maintain high hardness as in the buildup layer of the wear resisting structure member of Example 2.

Figure 19:
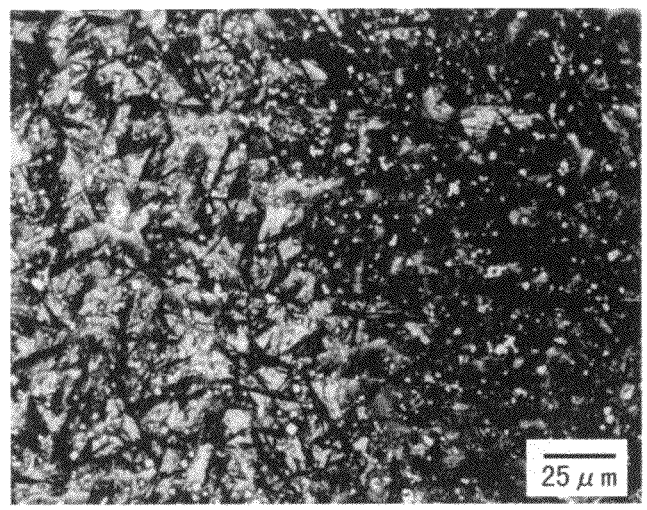
FIG. 19 is a photograph showing the crystal structure in the buildup layer of the wear resisting structure member of Example 2 shown in FIG. 15.

FIG. 19 is a photograph showing the crystal structure in the buildup layer of the wear resisting structure member of Example 2 shown in FIG. 15. The crystal structure has residual austenite and martensite, giving uniformly dispersed TiCN carbide (white powder). The hardness at the crystal structure portion is Hv 800. Also in FIG. 19, there was confirmed that the wear resisting particles composed of TiCN carbide can be almost uniformly dispersed in the buildup layer.

Figure 20:
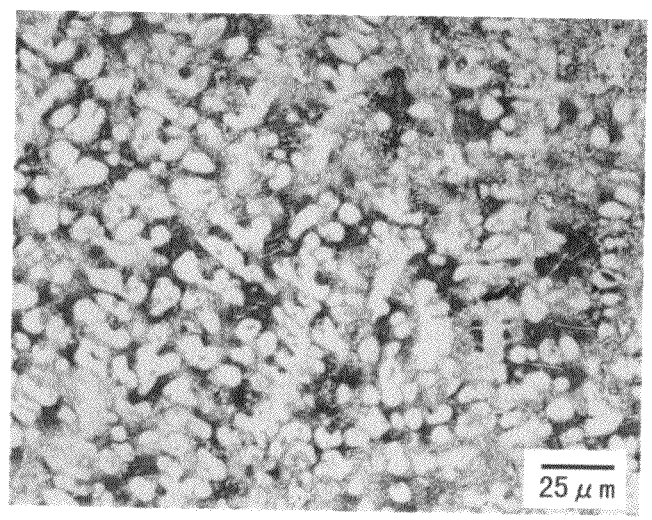
FIG. 20 is a photograph showing the crystal structure in the buildup layer of the wear resisting structure member of the comparative example shown in FIG. 16.

FIG. 20 is a photograph showing the crystal structure in the buildup layer of the wear resisting structure member of the comparative example shown in FIG. 16. The crystal structure has residual austenite and Fe—W eutectic precipitate. The hardness at the crystal structure portion is about Hv 500, which is lower than that of the buildup layer in Example 2.

Figure 21:
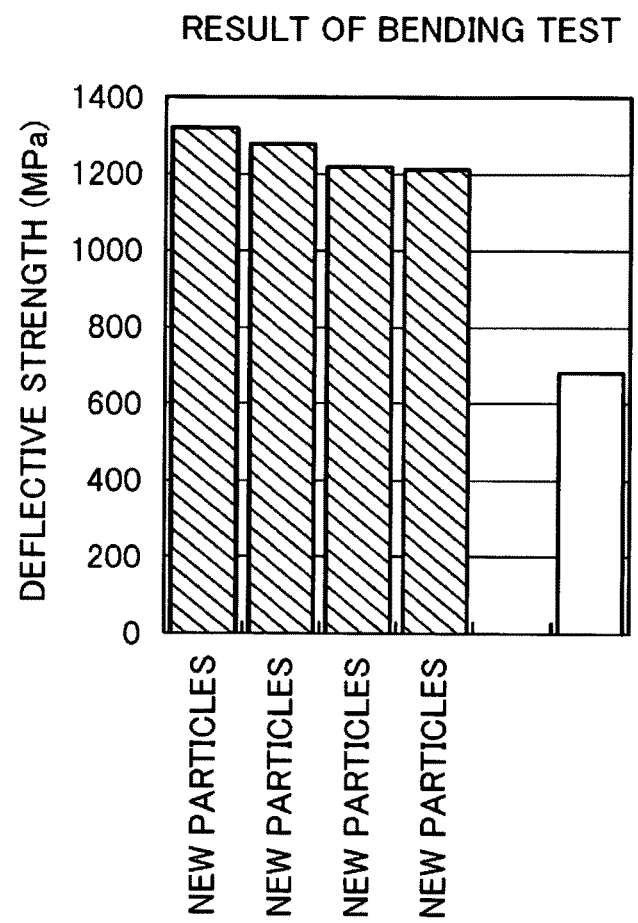
FIG. 21 is a graph showing the result of flexure test for the respective wear resisting structure members of Example 2 shown in FIG. 15 and of the comparative example shown in FIG. 16.

FIG. 21 is a graph showing the result of flexure test for the respective wear resisting structure materials of the Example 2 given in FIG. 15 and of the comparative example given in FIG. 16. There were prepared four pieces of specimens similar to the wear resisting structure member of Example 2, and was prepared the wear resisting structure member of Comparative Example. Flexure test was given to each of them. The result is given in FIG. 21 in terms of the new particles (1), the new particles (2), the new particles (3), the new particles (4), and the Comparative Example.

According to FIG. 21, it was confirmed that the wear resisting structure member of Example 2 keeps high deflective strength, while the wear resisting member of Comparative Example gives low deflective strength.

The above flexure test was conducted using a flexure test apparatus with the following procedure, (refer to JIS H5501).

1. The distance between supporting points of the flexure test apparatus is 20 mm or 30 mm. The radius of round tip of each supporting point and of loading point is about 2 mm and 3 mm, respectively. The supporting point and the loading point are made of super-hard metal. The loading point is at the center between the supporting points. During the test, when the fractured face of the specimen has crack, hole, and the like, and when they are judged to affect the test performance, the test performance is rejected, and the test is given again with other specimen which was prepared together with the rejected specimen.

2. For each preparation lot of specimens, the following-described specimen is prepared, and the specimen was polished on four sides smoothly in the longitudinal direction to a degree of about 1.5 S. The deviation in the thickness of the specimen is regulated to 0.1 mm or smaller.

(1) Distance between supporting points: 20 mm 24 mm (length)×8 mm (width)×4 mm (thickness)

(2) Distance between supporting points: 30 mm 35 mm (length)×10 mm (width)×6 mm (length)

3. The measurement is given by placing the specimen on the supporting points of the flexure test apparatus, by applying a load in the thickness direction of the specimen, and by gradually increasing the load. The load at the point of fracture of the specimen is recorded.

4. The calculation of deflective strength is done by the following formula.

$$\text{Deflective strength} = 3pl/2bt^2 \,(\text{kgf/mm}^2\{\text{N/mm}^2\})$$

where,
p: the load at the point of fracture (kgf{N})
b: the width of the specimen (mm)
t: the thickness of the specimen (mm)
l: the distance between the supporting points (mm)

Figure 22:
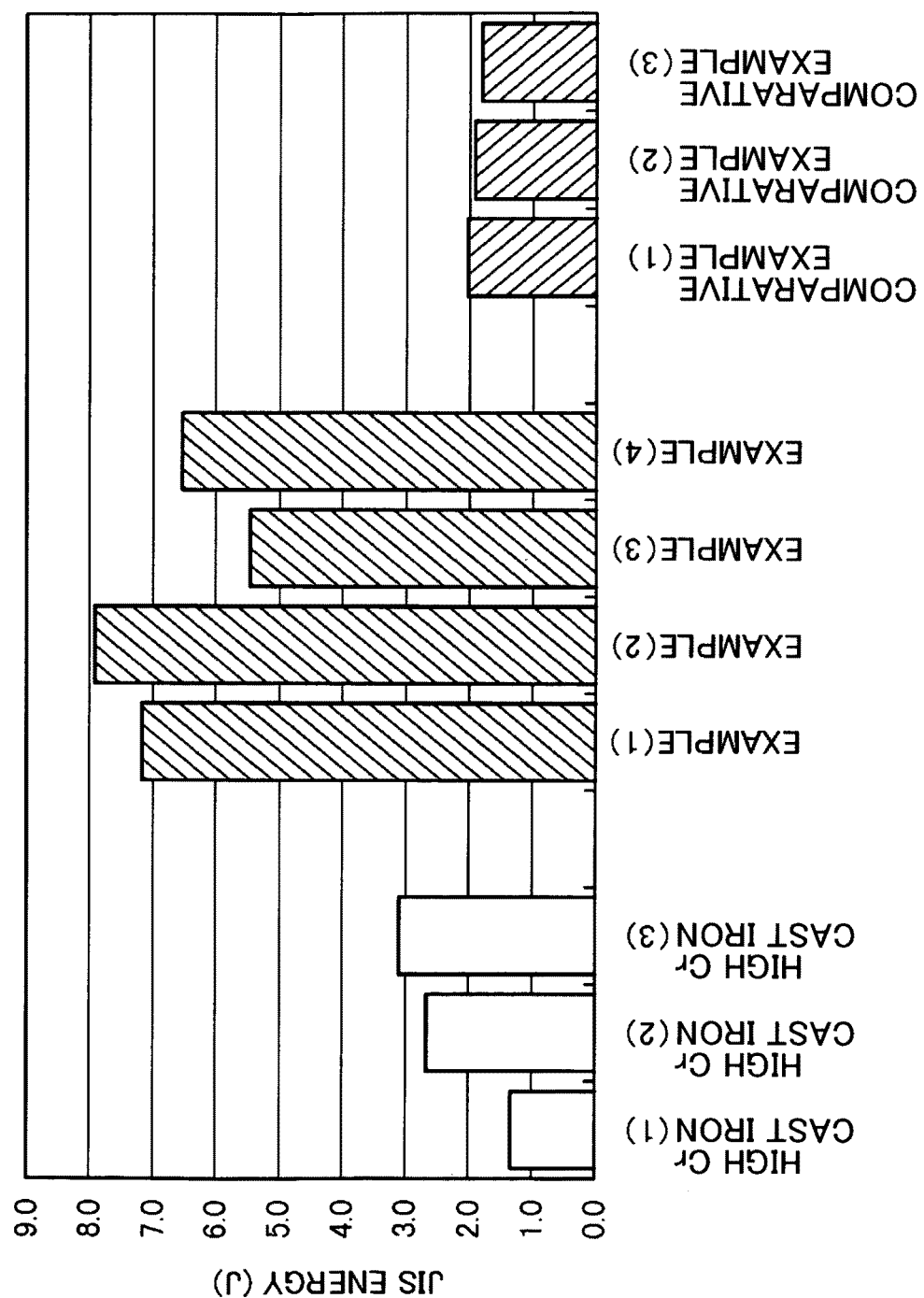
FIG. 22 is a graph showing the result of Charpy impact test conducted in a notchless state.

FIG. 22 is a graph showing the result of Charpy impact test executed in a notchless state. There were prepared four pieces of specimens similar to the wear resisting structure member of Example 2, three pieces of specimens of the wear resisting structure member of Comparative Example, and, for comparison, further three pieces of specimens of high Cr cast iron (28Cr-2.8C). For each of these specimens, Charpy impact test was given. The result is given in FIG. 22 in terms of (1), (2), (3), (4), Comparative Example (1), Comparative Example (2), Comparative Example (3), high Cr cast iron (1), high Cr cast iron (2), and high Cr cast iron (3).

The Charpy impact test is done by supporting the notchless specimen at both ends thereof, and by fracturing the specimen with a single blow of hammer under a specific condition, thus determining the characteristics, (refer to JIS Z2242).

The energy required to fracture the specimen is calculated by the following formula.

$$K = M(\cos \beta - \cos \alpha)$$

where,
K: the energy required to fracture the specimen (J)
M: the moment around the rotary shaft of hammer (N·m)
M=W·r
W: the load by the mass of hammer (N)
r: the distance from the center of rotary shaft of the hammer to the center of gravity (m)
α: the swing-up angle of the hammer (°)
β: the swing-up angle of the hammer after fracturing the specimen (°)

According to FIG. 22, it was confirmed that the wear resisting structure member of Example 2 is not fractured unless a high energy is applied, and that the wear resisting structure members of Comparative Example and of high Cr cast iron are fractured at a low energy.

Figure 23:
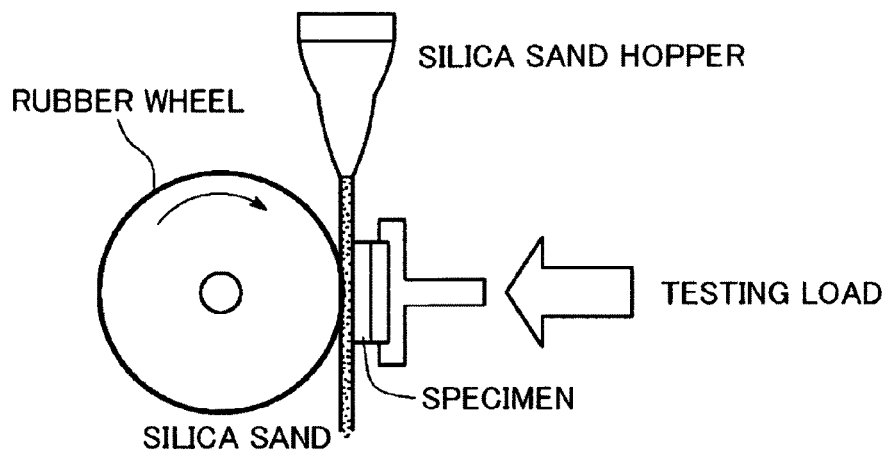
FIG. 23 shows a schematic drawing of an apparatus for conducting abrasion test to a test piece.
Figure 24:
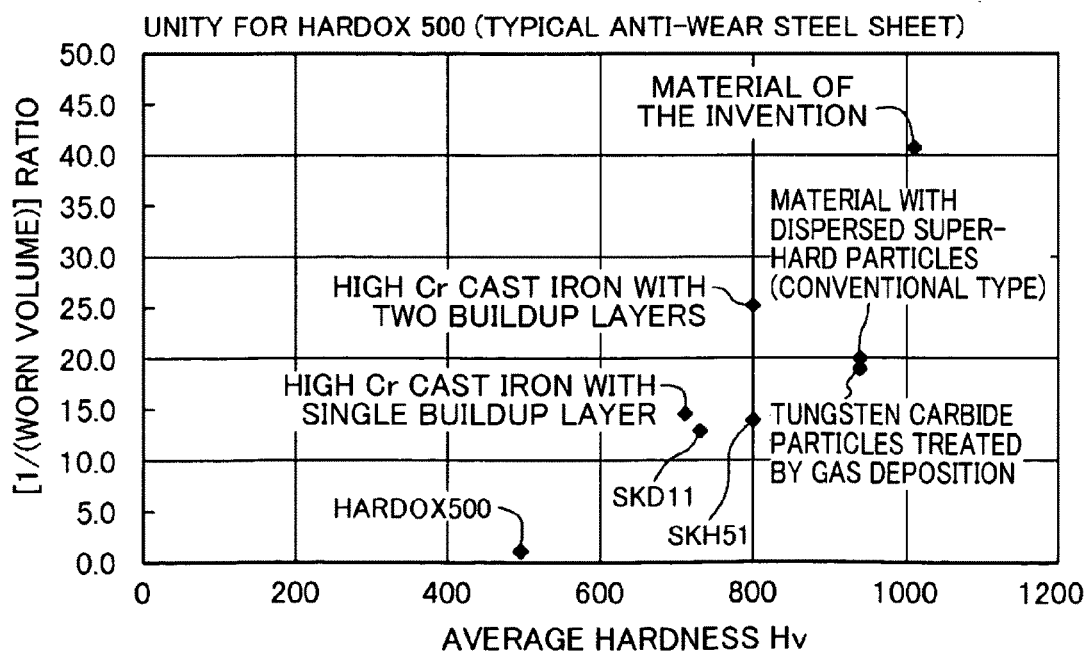
FIG. 24 is a graph showing the result of abrasion test using the apparatus shown in FIG. 23, giving the relationship between the average hardness and [1/(worn volume)] ratio.
Figure 25:
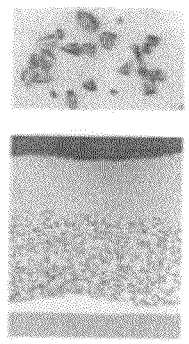
FIG. 25 illustrates the macroscopic structure of a cross section of a buildup alloy containing dispersed tungsten carbide particles.
Figure 26:
FIG. 26 illustrates the macroscopic structure of a cross section of a buildup alloy containing dispersed $Cr_3C_2$ particles.
Figure 27:
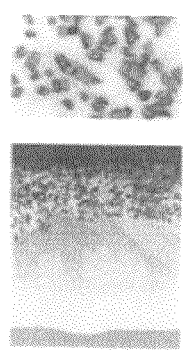
FIG. 27 illustrates the macroscopic structure of a cross section of a buildup alloy containing dispersed TiC particles.
Figure 28:
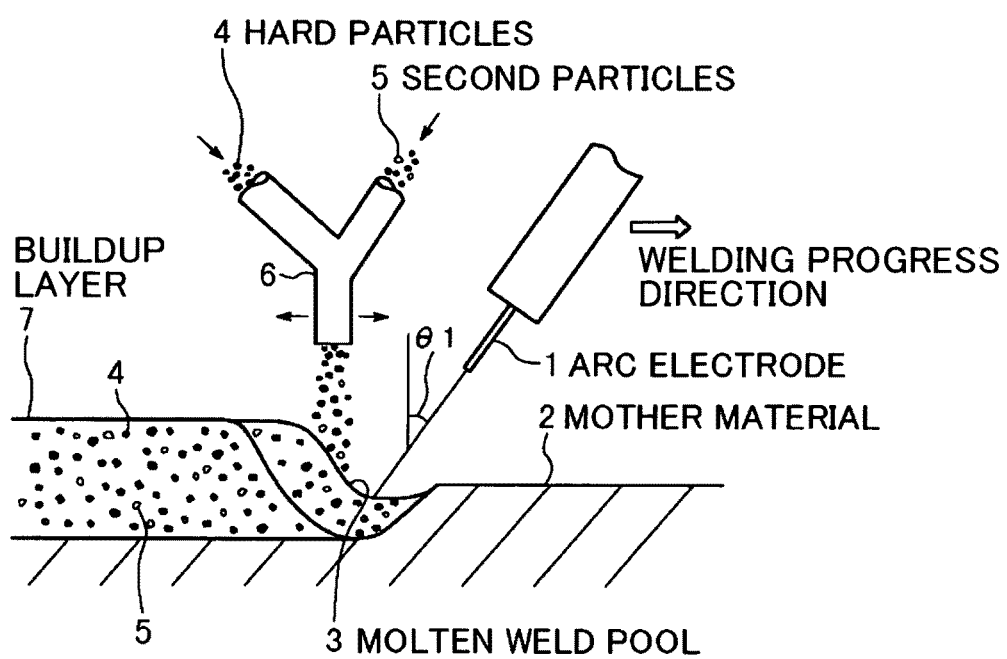
FIG. 28 is a schematic drawing illustrating another conventional method for manufacturing the wear resisting structure member.

FIG. 23 is a schematic drawing of the apparatus for conducting wear test to the specimen. FIG. 24 is a graph showing the result of wear test using the apparatus given in FIG. 23, giving the relationship between the average hardness and [1/(worn volume)] ratio.

For the wear-test, there were prepared a specimen of the wear resisting structure member of Example 2, (the material according to the present invention), and specimens for comparison. The comparative specimens were: HARDOX 500 of Sweden steel which is a typical wear resisting steel sheet, and JIS steels of SKD11, SKH51, high Cr cast iron with single layer of buildup, high Cr cast iron with two layers of buildup, tungsten carbide particles treated by gas welding, and superhard particles dispersed material (conventional type).

As illustrated in FIG. 23, a rubber wheel is rotated, and the specimen is pressed against the rubber wheel applying the testing load, while dropping silica sand in between the rubber wheel and the specimen from a silica sand hopper. The [1/(worn volume)] ratio is determined. The test condition is the following.

(Test Condition)
(1) Silica sand: 20 to 48 mesh
(2) Testing load: 13.26 kg
(3) Silica sand feed rate: 300 g/min
(4) Peripheral speed of rubber wheel: 100 m/min
(5) Test time: 20 min
(6) Dimensions of specimen: 12 t×25 w×75 L
(7) Wheel thickness: 12.7 mm According to FIG. 24, the wear resisting structure member of Example 2, which is the material of the present invention, was confirmed to have higher wear resisting property than that of the Comparative Example.

What is claimed is:

1. A wear resisting structure member comprising a mother phase metal and a plurality of wear resisting particles dispersed in said mother phase material thereby improving the wear resisting property,
   wherein each of said wear resisting particles has a particle size in a range from 0.2 to 9 mm,
   wherein each of said wear resisting particles comprises a material containing a first hard material and a second hard material, said material containing 60 to 96% by volume of carbide and balance of a metal,
   wherein a cross section of said mother phase metal extending in a vertical direction has an upper half and a lower half divided by a line perpendicular to the vertical direction, and
   wherein a quantity of said wear resisting particles existing in the upper half of said cross section is defined as "a", a quantity of said wear resisting particle existing in the lower half of said cross section is defined as "b", and a/b is 0.38 or larger.

2. The wear resisting structure member according to claim 1, wherein each of said first hard material and said second hard material binds said carbide therein with said metal.

3. The wear resisting structure member according to claim 1, wherein said wear resisting particle comprises a base and a coating layer coating the surface of said base.

4. The wear resisting structure member according to claim 3, wherein said coating layer is an alloy of any of Fe, Co, Ni, and Cu.

5. The wear resisting structure member according to claim 3, wherein said coating layer is a thermet containing tungsten carbide.

6. The wear resisting structure member according to claim 1, wherein said mother phase metal is an Fe-based material, said first hard material contains at least one of titanium carbide, vanadium carbide, and chromium carbide, and said second hard material contains at least one of molybdenum carbide and tungsten carbide.

7. The wear resisting structure member according to claim 1, wherein said mother phase metal is any of Co-based material, Ni-based material, and Cu-based material, said first hard material contains at least one of titanium carbide, vanadium carbide, and chromium carbide, and said second hard material contains at least one of molybdenum carbide and tungsten carbide.

8. The wear resisting structure member according to claim 1, wherein said mother phase metal containing said dispersed wear resisting particle is a wear resisting buildup layer, and said wear resisting buildup layer is built-up on a mother material.

9. The wear resisting structure member according to claim 1, wherein the hardness of each of said upper layer and said lower layer in said mother phase metal is in a range from Hv 700 to Hv 1000.

10. The wear resisting structure member according to claim 1, being applied to any of:
    a tooth plate, an impactor, a shearing edge, a cheek plate, a waste feeder bar, and a bit of a crusher;
    a track bush, sprocket teeth, and a shoe lug of a bulldozer;
    a bucket, a tooth adapter, a lip, a shroud between teeth, and a corner guard of a hydraulic excavator;
    a cutting edge, an end bit, a tooth, a ripper point, a protector, a wear plate, and a shank of ground engaging tool parts; and
    a chopper of an iron ring of a trash compactor.

11. The wear resisting structure member according to claim 1, wherein said first hard material is a material having a smaller specific gravity than that of said mother phase metal, and wherein said second hard material is a material having a larger specific gravity than that of said mother phase metal.

12. A plurality of wear resisting particles being dispersed in a mother phase metal, thereby improving the wear resisting property,
    wherein said wear resisting particles have a particle size in a range from 0.2 to 9 mm,
    wherein each of said wear resisting particle comprises a material containing a first hard material and a second hard material, said material containing 60 to 96% by volume of carbide and balance of a metal,
    wherein each of said wear resisting particles has a specific gravity in a range from 0.85 to 1.2 fold increase over the specific gravity of said mother phase metal,
    wherein a cross section of said mother phase metal extending in a vertical direction has an upper half and a lower half divided by a line perpendicular to the vertical direction, and
    wherein a quantity of said wear resisting particles existing in the upper half of said cross section is defined as "a", a quantity of said wear resisting particle existing in the lower half of said cross section is defined as "b", and a/b is 0.38 or larger.

13. The wear resisting particles according to claim 12, wherein each of said wear resisting particles comprises a base and a coating layer coating the surface of said base.

14. The wear resisting particles according to claim 12, wherein said first hard material is a material having a smaller specific gravity than that of said mother phase metal, and wherein said second hard material is a material having a larger specific gravity than that of said mother phase metal.

15. The wear resisting particles according to claim 13, wherein the coating layer of each of said wear resisting particles has a thickness of 0.1 mm or less.

16. The wear resisting particles according to claim 15, wherein each of said wear resisting particles is composed of TiCN as the base and WC as the coating layer.

* * * * *